US012584333B1

(12) United States Patent
Flannery et al.

(10) Patent No.: US 12,584,333 B1
(45) Date of Patent: Mar. 24, 2026

(54) OBLIQUE SLIDE LATCH APPARATUS

(71) Applicant: Regalo International, LLC, Burnsville, MN (US)

(72) Inventors: Mark A. Flannery, Longboat Key, FL (US); William D. Butterfield, River Falls, WI (US)

(73) Assignee: Regalo International, LLC, Burnsville, MN (US)

( * ) Notice: Subject to any disclaimer, the term of this patent is extended or adjusted under 35 U.S.C. 154(b) by 33 days.

(21) Appl. No.: 18/822,411

(22) Filed: Sep. 2, 2024

Related U.S. Application Data

(63) Continuation of application No. 17/857,027, filed on Jul. 3, 2022, now Pat. No. 12,077,999, which is a continuation of application No. 16/686,055, filed on Nov. 15, 2019, now Pat. No. 11,377,886.

(60) Provisional application No. 62/768,904, filed on Nov. 17, 2018.

(51) Int. Cl.
*E05B 65/00* (2006.01)
*E05B 1/00* (2006.01)
*E05C 1/12* (2006.01)

(52) U.S. Cl.
CPC .......... *E05B 65/0007* (2013.01); *E05B 1/003* (2013.01); *E05C 1/12* (2013.01)

(58) Field of Classification Search
CPC .......... E05B 9/02; E05B 9/04; E05B 65/0007; E05B 65/0014; E05B 1/003; E05C 1/166; E05C 1/12; E05Y 2900/40; E06B 11/022; E06B 2009/002; E06B 2009/05; Y10T 292/102; Y10T 292/57; Y10T 292/0969; Y10T 292/096; Y10T 292/1014; Y10T 292/1016; Y10T 292/0964; Y10T 292/29; Y10T 292/63; Y10S 292/29; Y10S 292/63
See application file for complete search history.

(56) References Cited

U.S. PATENT DOCUMENTS 5,367,829 A 11/1994 Crossley
5,442,881 A 8/1995 Asbach
5,782,039 A 7/1998 Scherer
5,924,242 A 7/1999 Macari
6,425,609 B2 7/2002 Cheng
7,627,985 B2 * 12/2009 Marsden ............ E05B 65/0014 49/394
7,963,575 B2 * 6/2011 Mayo ........................ E06B 9/04 49/57
7,975,431 B2 7/2011 Flannery
8,196,348 B2 6/2012 Flannery
8,205,388 B2 6/2012 Yates
8,448,381 B2 5/2013 Flannery
8,713,851 B2 5/2014 Flannery et al.
(Continued)

FOREIGN PATENT DOCUMENTS

CN 1324428 A 11/2001
CN 109025758 A 12/2018
(Continued)

*Primary Examiner* — Steven A Tullia

(57) ABSTRACT

The present oblique slide latch apparatus includes a housing, lever, and latch. A straight channel is positioned obliquely on the latch and is oblique relative to an axis along which the latch slides. The lever includes first and second pegs that capture inner and outer portions of a latch head to minimize wobble of the latch. The latch head is positioned within opposite sides of the lever.

1 Claim, 14 Drawing Sheets

(56) References Cited

U.S. PATENT DOCUMENTS

| | | | |
|---|---|---|---|
| 9,388,603 B2 | 7/2016 | Flannery et al. | |
| 9,410,348 B1 | 8/2016 | Flannery et al. | |
| 9,458,668 B1 | 10/2016 | Flannery | |
| 9,464,467 B1 | 10/2016 | Flannery et al. | |
| 9,689,197 B1 | 6/2017 | Flannery et al. | |
| 9,874,055 B1 | 1/2018 | Flannery et al. | |
| 10,091,970 B1 | 10/2018 | Flannery et al. | |
| 10,113,335 B1 | 10/2018 | Flannery et al. | |
| 10,287,819 B1 | 5/2019 | Flannery | |
| 10,533,370 B1 | 1/2020 | Flannery et al. | |
| 10,907,404 B1 | 2/2021 | Flannery | |
| 10,914,099 B2 | 2/2021 | Gentil | |
| 11,041,340 B1 * | 6/2021 | Flannery | E06B 9/02 |
| 11,162,300 B1 | 11/2021 | Flannery | |
| 11,377,886 B1 | 7/2022 | Flannery | |
| 11,739,589 B1 | 8/2023 | Kaiser | |
| 12,410,658 B1 * | 9/2025 | Flannery | E06B 11/02 |
| 2006/0081826 A1 * | 4/2006 | Cheng | E06B 9/04 256/22 |
| 2006/0175028 A1 | 8/2006 | Askinasi | |
| 2007/0074453 A1 | 4/2007 | Flannery | |
| 2008/0284180 A1 | 11/2008 | Newcombe | |
| 2011/0308160 A1 | 12/2011 | Boucquey | |
| 2014/0373448 A1 | 12/2014 | Henderson | |
| 2017/0350165 A1 | 12/2017 | Schort | |
| 2019/0078353 A1 | 3/2019 | Gentil | |
| 2019/0145127 A1 | 5/2019 | Flannery | |
| 2019/0234139 A1 | 8/2019 | Flannery | |

FOREIGN PATENT DOCUMENTS

| | | | | |
|---|---|---|---|---|
| CN | 109083581 A | | 12/2018 | |
| CN | 109162616 A | | 1/2019 | |
| DE | 20314871 U1 | | 1/2004 | |
| DE | 102008062774 A1 | * | 7/2010 | E05B 65/0007 |
| GB | 2310447 A | | 8/1997 | |
| JP | 2000245583 A | * | 9/2000 | E05C 9/02 |
| JP | 2003293643 A | * | 10/2003 | E05C 9/02 |
| JP | 3183004 U | | 4/2013 | |
| KR | 200462251 Y1 | | 5/2012 | |
| KR | 101443314 B1 | | 12/2013 | |
| KR | 101745271 B1 | | 7/2016 | |
| WO | WO-9829627 A1 | * | 7/1998 | E05C 1/06 |
| WO | 0236910 A1 | | 5/2002 | |

* cited by examiner

OBLIQUE SLIDE LATCH APPARATUS

This application is a continuation of U.S. patent application Ser. No 17,857,027 filed Jul. 3, 2022 (U.S. Pat. No. 12,077,999 issued Sep. 3, 2024) and claims the benefit thereof under 35 U.S.C. § 120, which application is a continuation of U.S. patent application Ser. No. 16/686,055 filed Nov. 15, 2019 (U.S. Pat. No. 11,377,886 issued Jul. 5, 2022) and claims the benefit thereof under 35 U.S.C. § 120, which application claims the benefit under 35 U.S.C. 119(e) of U.S. Provisional Patent Application No. 62/768,904 filed Nov. 17, 2018, all of which nonprovisional and provisional applications are hereby incorporated by reference in their entireties into this application.

FIELD OF THE INVENTION

The present invention generally relates to a latch apparatus, particularly relates to a latch apparatus having a lever, and specifically relates to a latch apparatus having a lever where the lever draws a latch out of engagement with a post of a gated barrier and then draws the latch back into engagement with the post of the gated barrier.

BACKGROUND OF THE INVENTION

A two action latch is something like a two step authentication or verification method to sign into an email account or secure website. A two action latch requires a first independent mechanical step and a second independent mechanical step prior to the gate of the gated barrier being capable of swinging from a closed position to an open position.

SUMMARY OF THE INVENTION

A feature of the present invention is the provision in a latch apparatus, of a housing having a proximal end and a distal end and of a latch slidably engaged to the housing, where the latch extends out the distal end of the housing.

Another feature of the present invention is the provision in such a latch apparatus, of the latch slidable along a straight axis, where the latch includes a latch distal end portion that engages an object.

Another feature of the present invention is the provision in such a latch apparatus, of the latch having a straight channel with an upper end straight portion and a lower end straight portion.

Another feature of the present invention is the provision in such a latch apparatus, of a lever where the lever includes a proximal end portion and a distal end portion, and where the lever is pivotably engaged to the housing.

Another feature of the present invention is the provision in such a latch apparatus, of the distal end portion of the lever having a first peg, where the first peg extends laterally such that, when the lever is pivoted, a travel of the first peg defines a first arc.

Another feature of the present invention is the provision in such a latch apparatus, of the first peg of the lever engaging the straight channel of the latch.

Another feature of the present invention is the provision in such a latch apparatus, of the straight channel being oblique relative to the straight axis along which the latch slides.

Another feature of the present invention is the provision in such a latch apparatus, of, when the lever is pivoted one way, the first peg traveling along the first arc from the upper end straight portion of the straight channel to the lower end straight portion of the straight channel and thereby slidingly drawing the latch toward the proximal end of the housing.

Another feature of the present invention is the provision in such a latch apparatus, of, when the lever is pivoted opposite of such one way, the first peg traveling along the first arc from the lower end straight portion of the straight channel to the upper end straight portion of the straight channel and thereby slidingly drawing the latch away from the proximal end of the housing.

Another feature of the present invention is the provision in such a latch apparatus, of the lever being pivotably engaged to the housing by a pivot pin laterally engaging the housing and lever, where the latch includes a slot that extends in a direction that the latch slides, and where the slot engages the pivot pin.

Another feature of the present invention is the provision in such a latch apparatus, of the distal end portion of the lever including a second peg, where the second peg extends laterally such that, when the lever is pivoted, a travel of the second peg defines a second arc, where the latch includes a latch edge, and where the second peg slides on the latch edge when the latch is drawn toward the distal end of the housing.

Another feature of the present invention is the provision in such a latch apparatus, of the lever having an open position and a closed position, where when the lever is in the open position the first peg is disposed distally of the second peg, and where when the lever is in the closed position the first peg is disposed distally of the second peg.

Another feature of the present invention is the provision in such a latch apparatus, of the lever having an open position and a closed position, where when the lever is in the open position the first peg is disposed at a greater altitude than the second peg, and where when the lever is in the closed position the first peg is disposed at a greater altitude than the second peg.

Another feature of the present invention is the provision in such a latch apparatus, of the latch including a latch head and a latch neck, where the latch head includes a greater width than the latch neck, where at least a portion of the latch neck is engaged in the housing, where the latch head is disposed outside of the housing when the lever is in the open position and when the lever is in the closed position, and where the straight channel is formed in the latch head.

Another feature of the present invention is the provision in such a latch apparatus, of the latch including a latch head and a latch neck, where the latch head includes a greater width than the latch neck, where at least a portion of the latch neck is engaged in the housing, where the latch head is disposed outside of the housing when the lever is in the open position and when the lever is in the closed position, where the latch head includes outer faces, where the lever includes inner faces, and where the inner faces of the lever extend over and are adjacent to the outer faces of the latch head.

Another feature of the present invention is the provision in such a latch apparatus, of the latch including a latch head and a latch neck, where the latch head includes a greater width than the latch neck, where at least a portion of the latch neck is engaged in the housing, where the latch head is disposed outside of the housing when the lever is in the open position and when the lever is in the closed position, where the latch head includes a U-shaped channel formed in part by first and second latch sides, and where the first latch side extends distally of the second latch side.

Another feature of the present invention is the provision in such a latch apparatus, of the first peg including a cylindrical portion.

Another feature of the present invention is the provision in such a latch apparatus, of the second peg including a peg edge with first and second peg edge portions, where the first peg edge portion engages the latch edge when the lever is in the closed position, and where the second peg edge portion engages the latch edge when the lever is in the open position.

Another feature of the present invention is the provision in such a latch apparatus, of the lever being springless.

Another feature of the present invention is the provision in such a latch apparatus, of a housing having a proximal end and a distal end; of a latch slidably engaged to the housing, where the latch extends out the distal end of the housing, where the latch is slidable along a straight axis, where the latch includes a latch distal end portion that engages the object, and where the latch includes a channel with an upper end portion and a lower end portion; of a lever having a proximal end portion and a distal end portion, where the lever is pivotably engaged to the housing, where the distal end portion of the lever includes a first peg, where the first peg extends laterally such that, when the lever is pivoted, a travel of the first peg defines a first arc, and where the first peg of the lever engages the channel of the latch such that: i) when the lever is pivoted one way, the first peg travels along the first arc from the upper end portion of the channel to the lower end portion of the channel and thereby slidingly draws the latch toward the proximal end of the housing; and ii) when the lever is pivoted opposite of said one way, the first peg travels along the first arc from the lower end portion of the channel to the upper end portion of the straight channel and thereby slidingly draws the latch away from the proximal end of the housing; and of the distal end portion of the lever including a second peg, where the second peg extends laterally such that, when the lever is pivoted, a travel of the second peg defines a second arc, where the latch includes a latch edge, and where the second peg slides on the latch edge when the latch is drawn toward the distal end of the housing.

Another feature of the present invention is the provision in such a latch apparatus, of a housing having a proximal end and a distal end; of a latch slidably engaged to the housing, where the latch extends out the distal end of the housing, where the latch is slidable along a straight axis, where the latch includes a latch distal end portion that engages the object, where the latch includes a channel with an upper end portion and a lower end portion; of a lever having a proximal end portion and a distal end portion, where the lever is pivotably engaged to the housing, where the distal end portion of the lever includes a first peg, where the first peg extends laterally such that, when the lever is pivoted, a travel of the first peg defines a first arc, where the first peg of the lever engages the channel of the latch such that: i) when the lever is pivoted one way, the first peg travels along the first arc from the upper end portion of the channel to the lower end portion of the channel and thereby slidingly draws the latch toward the proximal end of the housing; and ii) when the lever is pivoted opposite of said one way, the first peg travels along the first arc from the lower end portion of the channel to the upper end portion of the channel and thereby slidingly draws the latch away from the proximal end of the housing; and of the latch including a latch head and a latch neck, where the latch head includes a greater width than the latch neck, where at least a portion of the latch neck is engaged in the housing, where the latch head is disposed outside of the housing when the lever is in the open position and when the lever is in the closed position, where the latch head includes outer faces, where the lever includes inner faces, and where the inner faces of the lever extend over and are adjacent to the outer faces of the latch head; and of the channel being formed in the latch head.

An advantage of the present invention is that the lengthwise size of the latch apparatus is minimized. One feature that contributes to this advantage is the channel that is obliquely oriented and that is engaged when the lever is opened. Another feature that contributes to this advantage is the placement of the oblique channel in the head of the latch.

Another advantage of the present invention is that the latch slides straight and true with minimum wobble. One feature that contributes to this advantage is the first peg that engages the oblique channel on the head of the latch. A second feature that contributes to this advantage is the second peg that engages an edge of the head of the latch. A third feature that contributes to this advantage is that the entire latch, including the head of the latch, is disposed between sides of the lever. Each of the first and second pegs continuously relatively slides on its respective portion of the head of the latch so as to continuously engage the head of the latch while the latch slides into and out of the housing.

Another advantage of the present invention is that a pinching of fingers is minimized. One feature contributing to this advantage is that the widest portion of the latch apparatus is the lever. The distance between inner sides of the lever is greater than the distance between outer sides of the head of the latch. Another feature contributing to this advantage is that the housing includes an extension that covers up a transition from the neck of the latch to the head of the latch.

Another advantage of the present invention is that the present latch apparatus is a two action latch. In other words, prior to an opening of the attendant gated barrier, a first mechanical independent step must be performed and subsequently a second mechanical independent step must be performed. If an attempt is made to first perform the second mechanical independent step, the latch apparatus cannot be opened without destroying an integrity of the latch apparatus.

Another advantage of the present invention is that the present latch apparatus includes a minimum of parts.

Another advantage of the present invention is that the present latch apparatus is inexpensive to manufacture.

Another advantage of the present invention is that the present latch apparatus is simple to use when the operation is an opening of the latch.

Another advantage of the present invention is that the present latch apparatus is simple to use when the operation is a closing of the latch.

DESCRIPTION

Figure 1A:
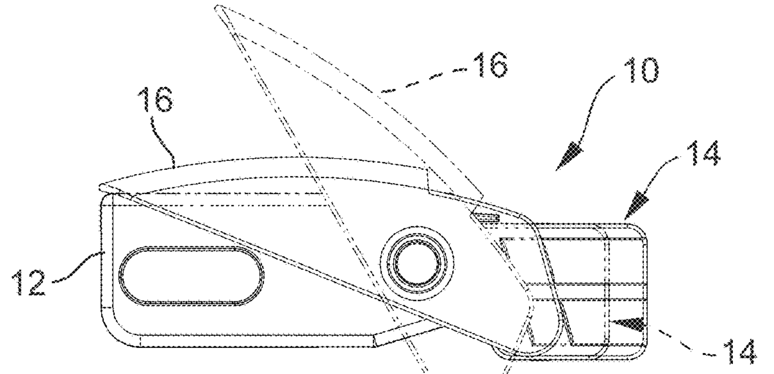
FIG. 1A is an isolated side partially phantom view of the lift lever, housing, and latch of the present oblique slide latch apparatus.

As shown in FIG. 1A, the present latch apparatus is indicated by reference number 10. Latch apparatus 10 includes a housing 12, a latch 14, and a lever 16. The lever 16 pivots or swings between closed and open positions. The solid lead lines show a closed position for the lever 16 and latch 14. The dashed or phantom lead lines show an open position for the lever 16 and the latch 14. When the lever 16 is pivoted up, then the latch 14 is drawn in. When the lever is pivoted down, then the latch 14 is drawn out.

Figure 1B:
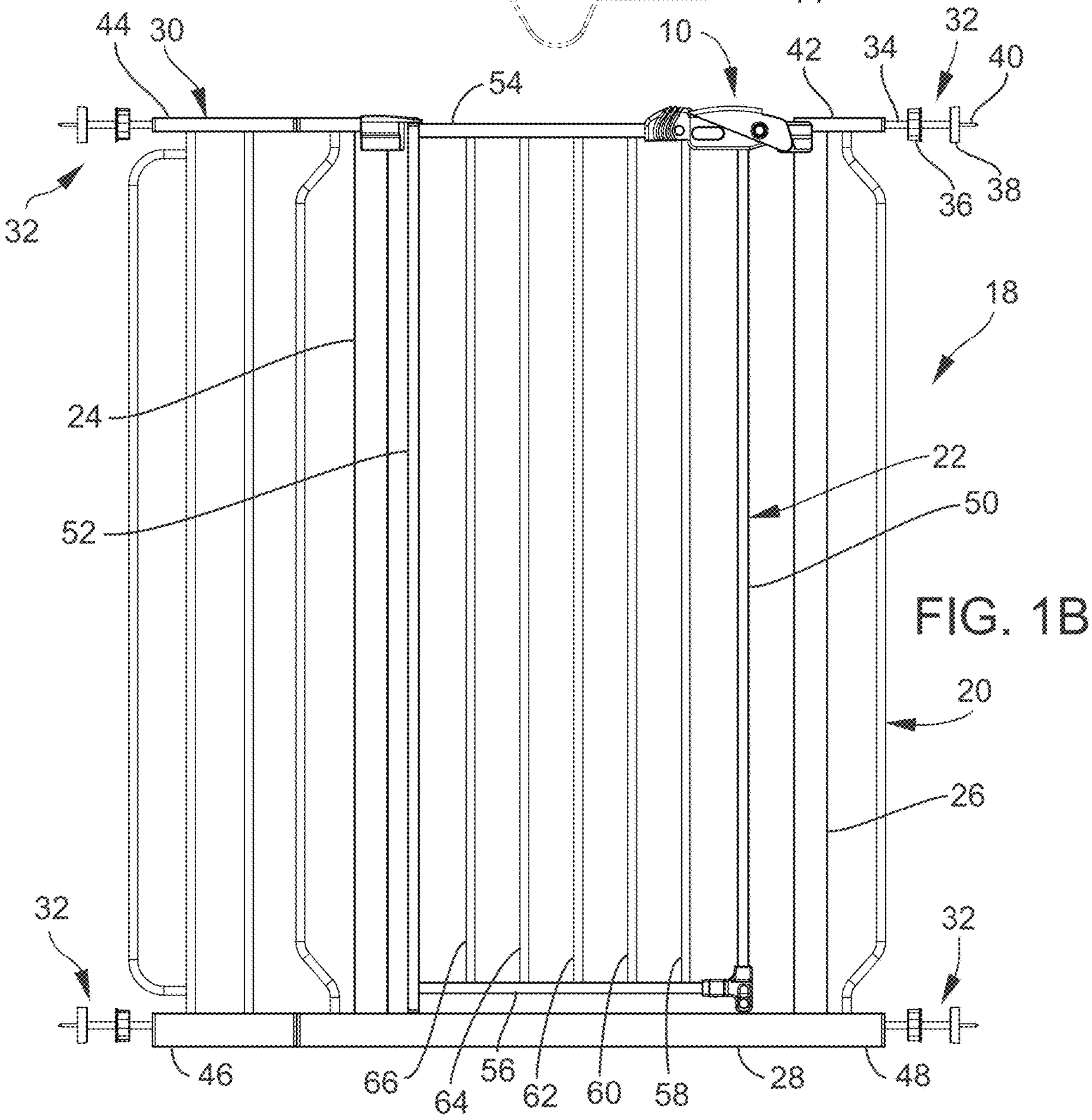
FIG. 1B is a side view of a gated barrier having the present oblique slide latch apparatus including the slide lock, lift lever, housing, and latch.

FIG. 1B shows the latch apparatus 10 on a gated barrier 18. Gated barrier 18 includes a frame 20 and a gate 22 within the frame 20. Frame 20 is a U-shaped open top frame. Frame 20 includes a left standard 24, a right standard 26, and a lower horizontal support 28 or threshold 28 between the standards 24, 26. A frame extension 30 is engaged to the left side of the frame 20. Disposed between the frame 20 and a vertical environmental object such as a door jamb or wall to the right of the frame 20 and disposed between the frame extension 30 and a vertical environmental object such as a door jamb or wall to the left of the frame extension 30, is a set of four frame-to-wall connectors 32. Connectors 32 include a threaded shaft 34, a hand wheel 36 threadingly engaged on the shaft 34, and a wall cup 38 for engaging the vertical environmental object such as a door jamb or wall. The wall cup 38 is fixable to the door jamb or wall by a pin connector 40 such as a screw. Hidden from sight is a rotatable disk on the end of the shaft 34 that is received by the wall cup 38. The threaded shaft 34 may or may not be threadingly engaged with a respective corner portion 42, 44, 46, 48 of the frame 20 and frame extension 30. Preferably the threaded shaft 34 slides into and out of its respective corner portion 42, 44, 46, 48 without being threadingly engaged. The frame 20 and frame extension 30 hold the gated barrier 18 in place, and optionally off the floor, by the hand wheel 36 being turned so as to increase the effective distance of the shaft 34 between the hand wheel 36 and the disk in the wall cup 38. The hand wheel 36 abuts the corner portion 42, 44, 46, 48 and the disk abuts the wall cup 38 that is engaged to the door jamb or wall. When such effective distance is increased, one result is to pressurize the frame 20 and frame extension 30. In other words, one or more of the standards 24, 26 are manufactured to be oblique relative to the lower horizontal support 28. However, when the frame 20 and frame extension 30 are pressurized by increasing such effective distance, such one or more standards 24, 26 are drawn into a right angle relationship with the lower horizontal support 28, thereby drawing the upper portion of standard 26 into engagement with the latch 14 of the latch apparatus 10.

The gate 22 includes outer or end support members 50, 52. End support member 52 defines the pivot axis of the gate 22. Gate 22 further includes an upper horizontal or transverse support member 54 and a lower horizontal or transverse support member 56. Gate 22 further includes, disposed between end support member 50, 52, a set of vertical support members 58, 60, 62, 64, and 66 that extend from the lower horizontal support member 56 to the upper horizontal support member 54. Vertical support members 50, 58, and 60 extend into the latch apparatus 10 and are engaged to the upper horizontal support member 54. In FIG. 1A, the latch apparatus 10 is closed and the gate 22 is closed.

Figure 2A:
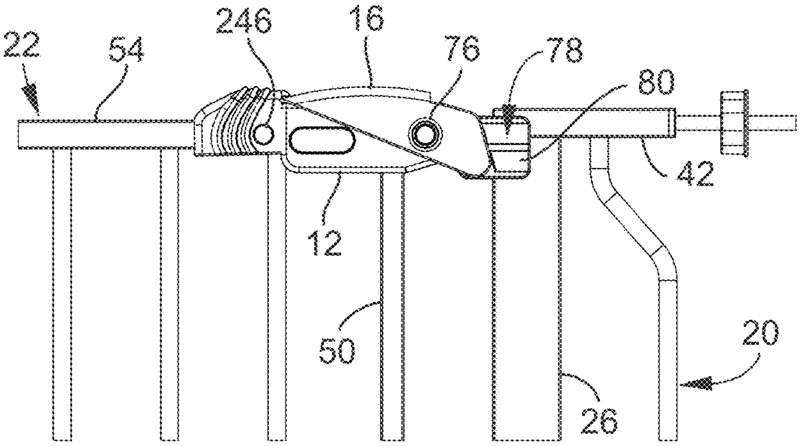
FIG. 2A is a side view of the oblique slide latch apparatus of FIG. 1B in a closed position.

FIG. 2A shows a front view of the latch apparatus 10. Latch apparatus 10 includes a spring loaded slide lock 68. Slide lock 68 is mounted on the upper horizontal member 54 of gate 22. An internally mounted spring 70, shown in FIGS. 9A, 9B, 9C, and 9D, biases the slide lock 68 toward the housing 12. Slide lock 68 includes a main body 72 and a ledge 74 extending from the main body 72. Ledge 74 extends in the direction of the housing 12. Ledge 74 includes an oblique upper portion that extends downwardly and toward the latch apparatus 18 such that the lever 16 can snap back into a locking relationship with the slide lock 68.

Lever 16 swings or pivots on a pivot pin 76. Pivot pin 76 engages the housing 12, further engages the latch 14, and further engages the gate upper horizontal support member 54. Pivot pin 76 is secured to the latch apparatus 16 by a lock washer or clip 77.

Figure 2B:
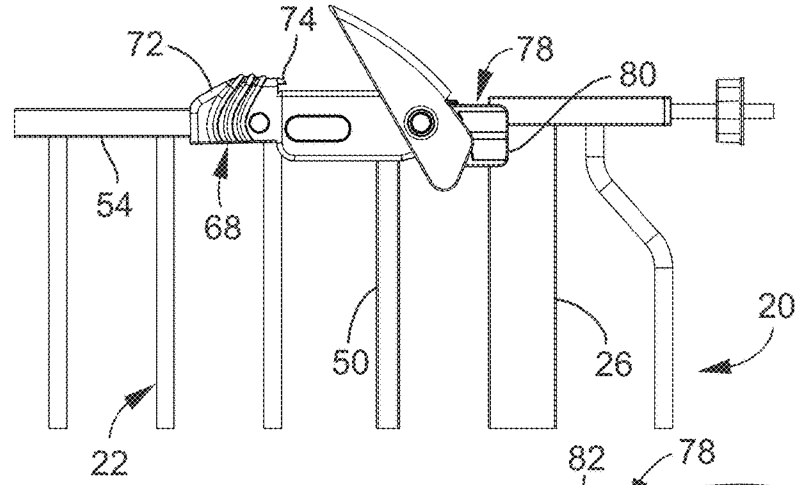
FIG. 2B is a side view of the oblique slide latch apparatus of FIG. 2A in an open position.

Latch 14 includes a latch head 78. Latch head 78 includes a U-shape that includes a first longer extension 80 and a second shorter extension 82. Latch head longer extension 80 is shown in FIGS. 2A and 2B. Latch head shorter extension 82 is shown in FIGS. 2C and 2D.

Figure 2C:
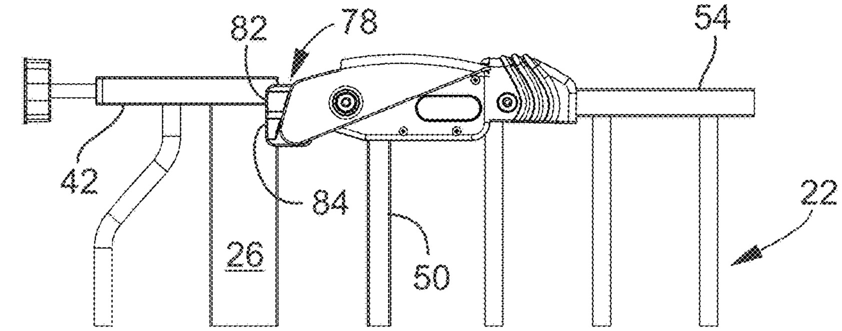
FIG. 2C is a side view of the oblique slide latch apparatus from the other side of the side shown in FIG. 2A, and shows a closed position of the oblique slide latch apparatus.

Latch 14 is closed in FIGS. 2A and 2C. Latch 14 is open in FIGS. 2B and 2D.

In each of the closed and open positions as shown in FIGS. 2A and 2B, the first extension 80 of the latch head 78 extends over a portion of the frame 20, including over a portion of standard 26 and frame corner portion 42. This shows that gate 22 is a one way gate. Whether the lever 16 is closed as shown in FIG. 2A or open as shown in FIG. 2B, the first extension 80 of the latch head 78 extends over a portion of the frame 20. Gate 22 swings only one way, with this one way being toward the viewer in FIG. 2B and away from the viewer in FIG. 2D.

Figure 2D:
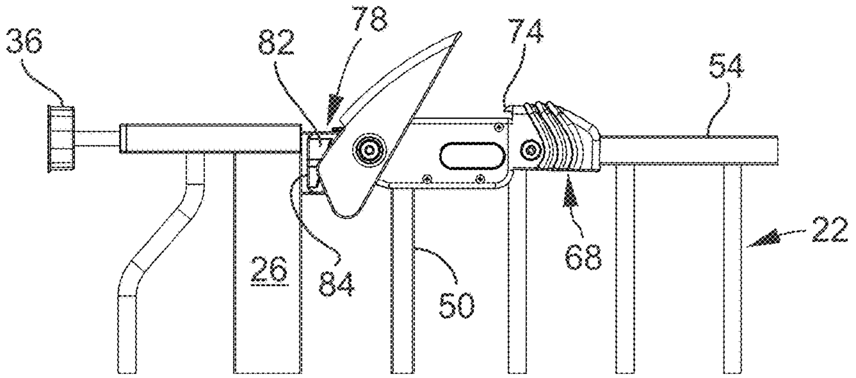
FIG. 2D is a side view of the oblique slide latch apparatus from the other side of the side shown in FIG. 2B, and shows an open position of the oblique slide latch apparatus.

FIGS. 2C and 2D show the latch head extension 82. In the closed position of FIG. 2C where the lever 16 is closed, the latch head extension 82 extends over a portion of the frame 20, including over a portion of standard 26 and frame corner portion 42 such that the gate 22 cannot swing. In the open position of FIG. 2D where the lever 16 is open, the latch head extension 82 has been drawn inwardly such that a distal vertical edge of the latch head extension 82 has been drawn away from an inner edge of frame standard 26 and frame corner portion 42.

Figure 3A:
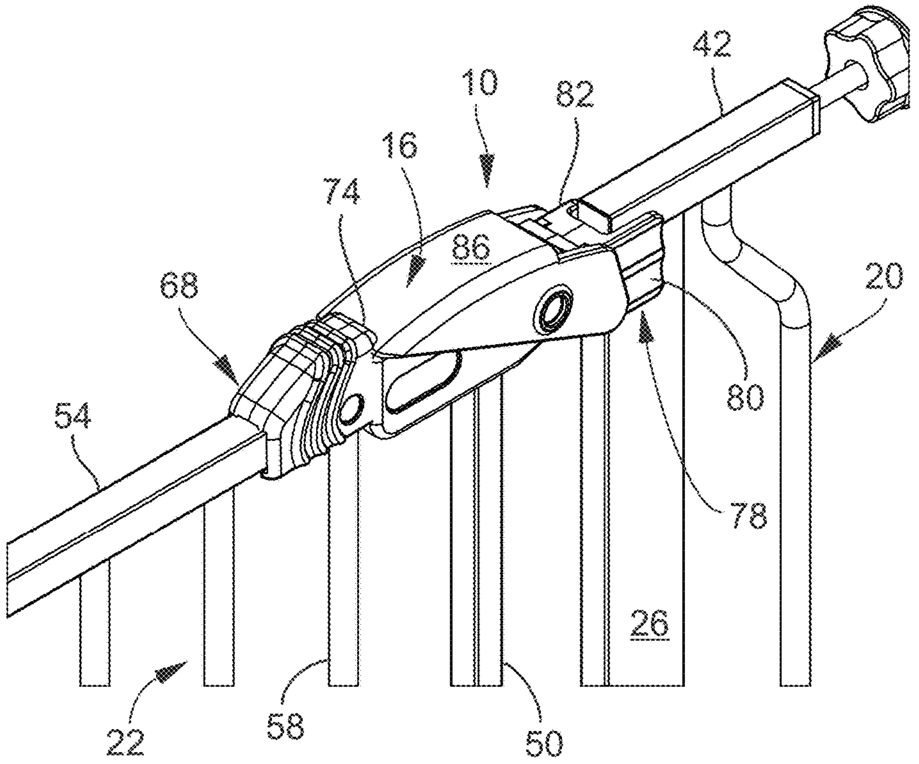
FIG. 3A is a perspective view of the oblique slide latch apparatus of FIG. 1A and shows a closed position of the oblique slide latch apparatus.

In FIG. 3A the U-shaped latch head 78 extends to each side of the standard 26 such that latch head extension 80 extends over one side or face of the standard 26 and such that latch head extension 82 extends over the other side or face of the standard 26. Here the lever 16 is closed and the proximal end of the second action lever 16 is locked by the ledge 74 of the first action slide lock 68.

Figure 3B:
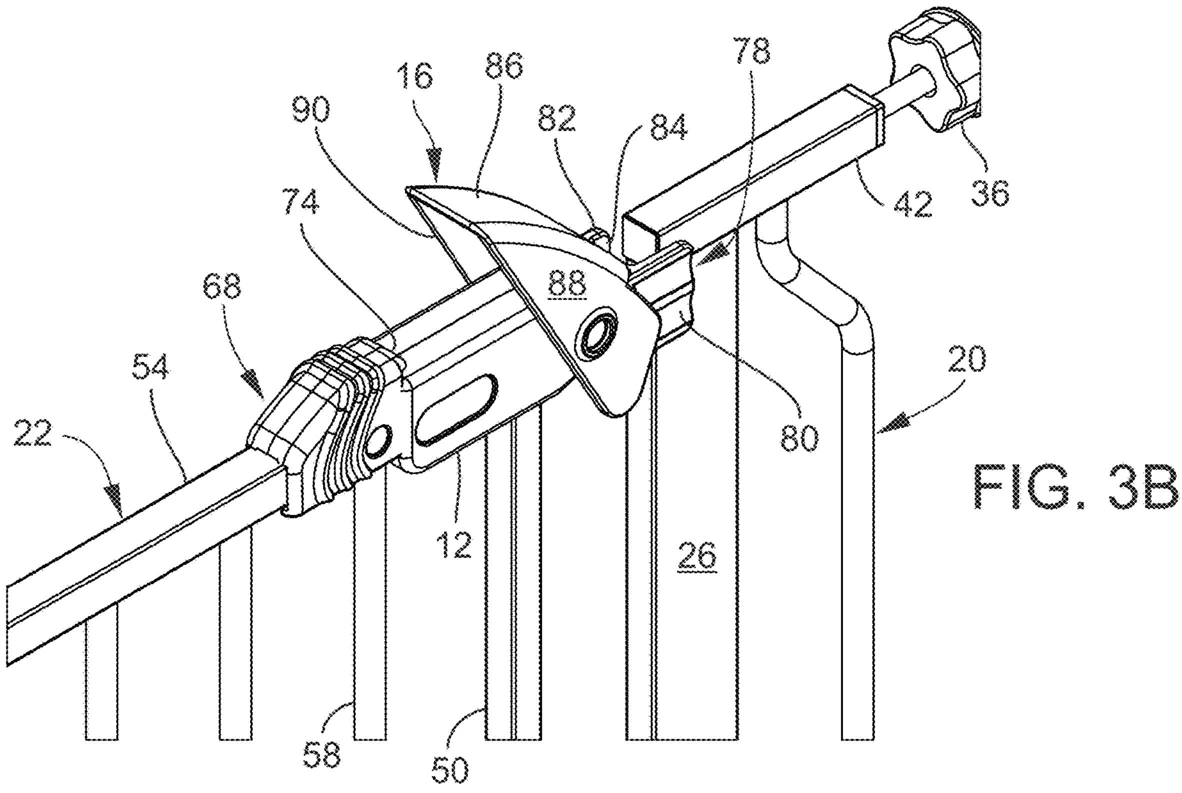
FIG. 3B is a perspective view of the oblique slide latch apparatus of FIG. 3A and shows an open position of the oblique slide latch apparatus.

In FIG. 3B the latch head extension 82 is withdrawn from its respective face of the standard 26 when the lever 16 is pivoted to an open position, after the slide lock 68 has been slid away from the proximal end of the lever 16. Here, where the lever 16 has been pivoted to an open position, the latch head extension 80 still extends over a portion of the standard 26 such that the gate 22 swings only one way, which way is toward the face of the standard 26 over which the latch head extension 80 extends. The latch head extension 80 extends over such face of the standard 26 when the lever 16 is pivoted to the open position and when the lever 16 is pivoted to the closed position and when the gate 22 is in the closed position.

In FIGS. 3A and 3B, it can be seen that the lever 16 includes a top 86, a first side 88, and a second side 90. Sides 88, 90 are generally triangular shaped. Top 86 is curved. Sides 88, 90 extend forwardly of a distal edge 258 of the top 86. The distance between the inner faces of sides 88, 90 is greater than the distance between the outer faces of the latch head 78 such that latch head 78 is disposed within the latch sides 88, 90.

Figure 4A:
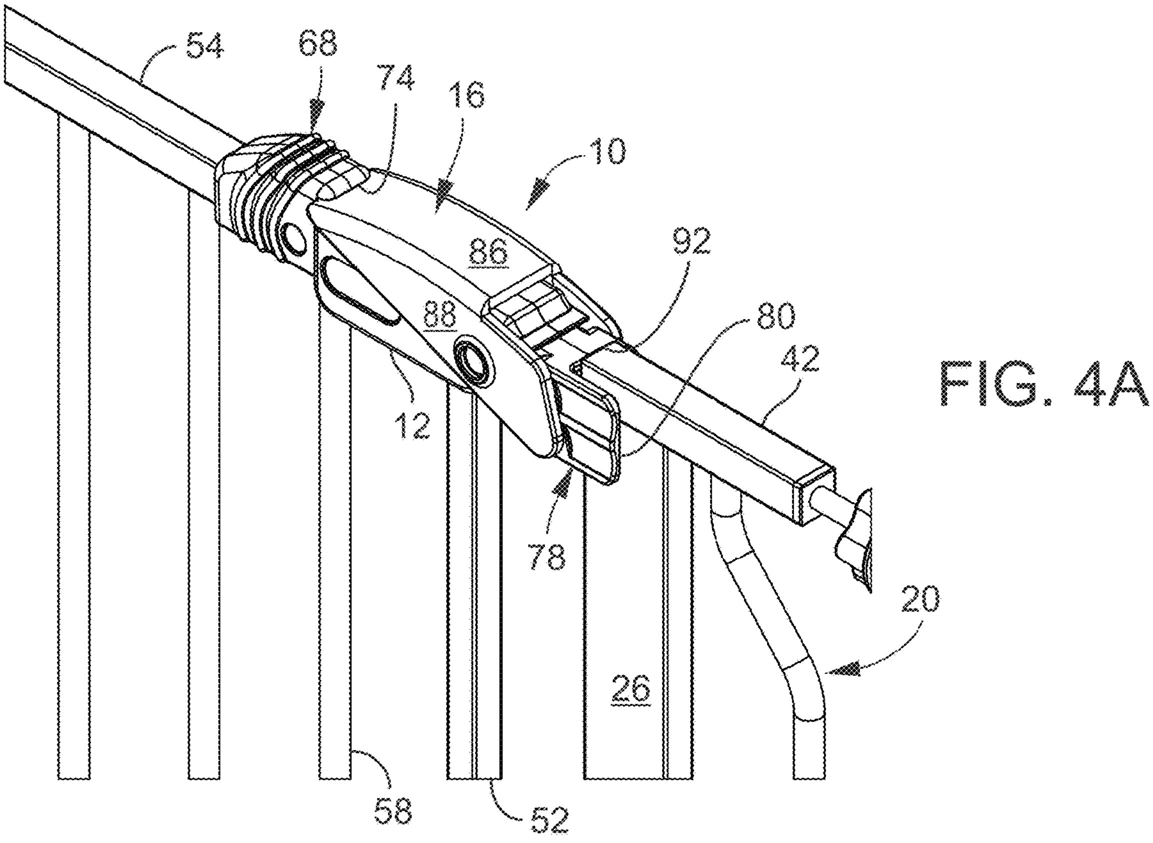
FIG. 4A is a perspective view of the oblique slide latch apparatus of FIG. 3A from the other side of FIG. 3A and shows a closed position of the oblique slide latch apparatus.
Figure 4B:
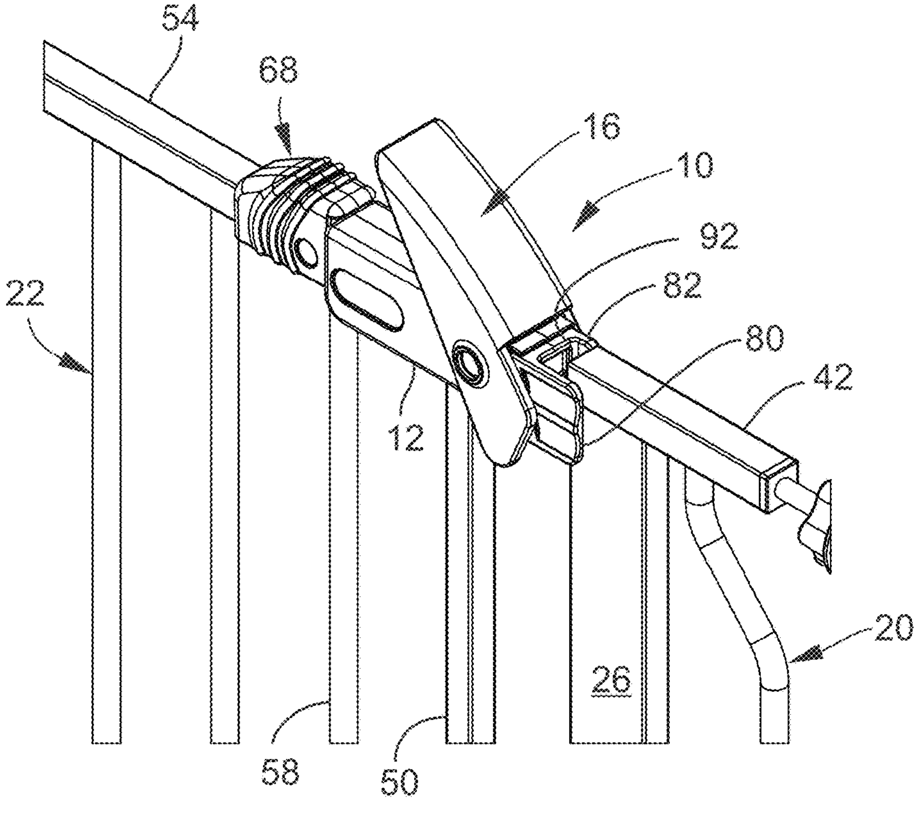
FIG. 4B is a perspective view of the oblique slide latch apparatus of FIG. 3B from the other side of FIG. 3B and shows an open position of the oblique slide latch apparatus.

FIGS. 4A and 4B show the latch apparatus 10 from a perspective different from the perspective of FIGS. 3A and 3B. In FIG. 4A the lever 16 is closed and the gate 22 is closed, with the latch head 78 engaging the standard 26. In FIG. 4B the lever 16 has been pivoted to the open position where latch head extension 80 is engaged with the standard 26 and where latch head extension 82 is disengaged from the standard 26.

Figure 5A:
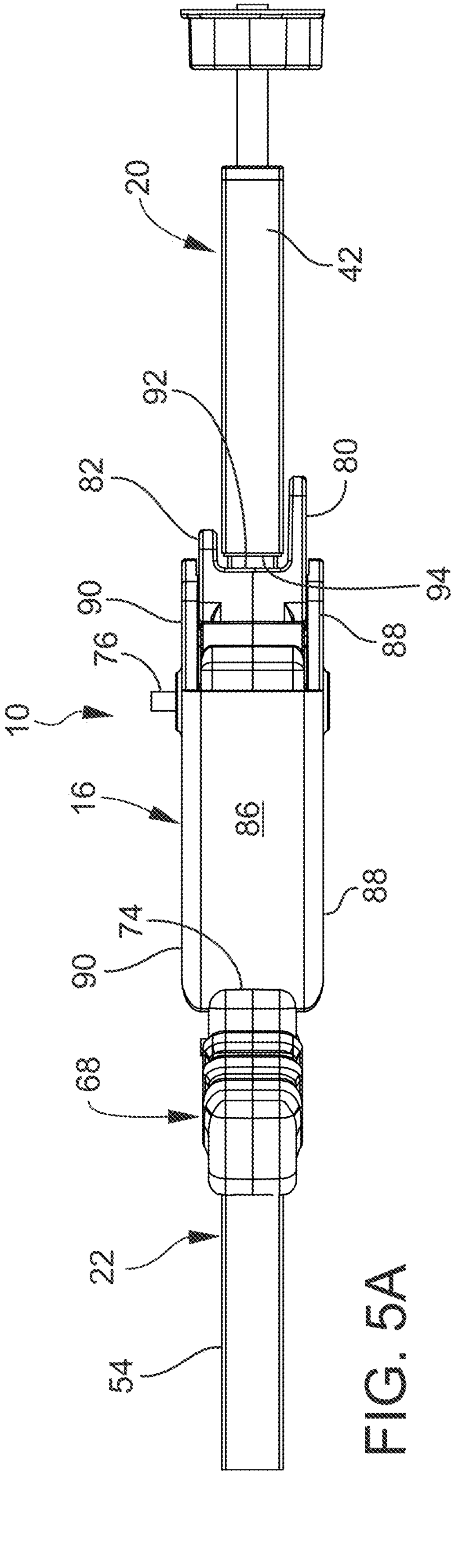
FIG. 5A is a top view of the oblique slide latch apparatus of FIG. 1A and shows a closed position of the oblique slide latch apparatus.
Figure 5B:
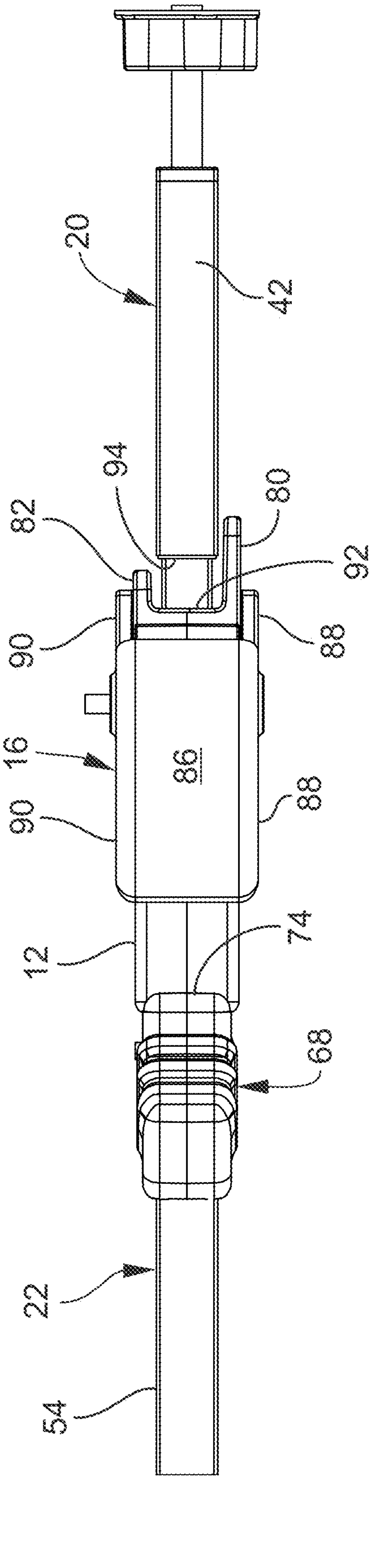
FIG. 5B is a top view of the oblique slide latch apparatus of FIG. 5A and shows an open position of the oblique slide latch apparatus.

FIGS. 5A and 5B show top views of the closed and open positions of the lever 16. Latch head 78, which includes a distal U-shaped portion and is H-shaped as a whole, includes a base 92. When each of the latch head extensions 80, 82 are engaged with standard 96, as shown in FIG. 5A, latch head base 92 confronts the inner face 94 of the standard 26. When latch head extension 82 is disengaged from standard 96, latch head base 92 is spaced from the inside face 94 of standard 26, as shown in FIG. 5B.

Figure 6:
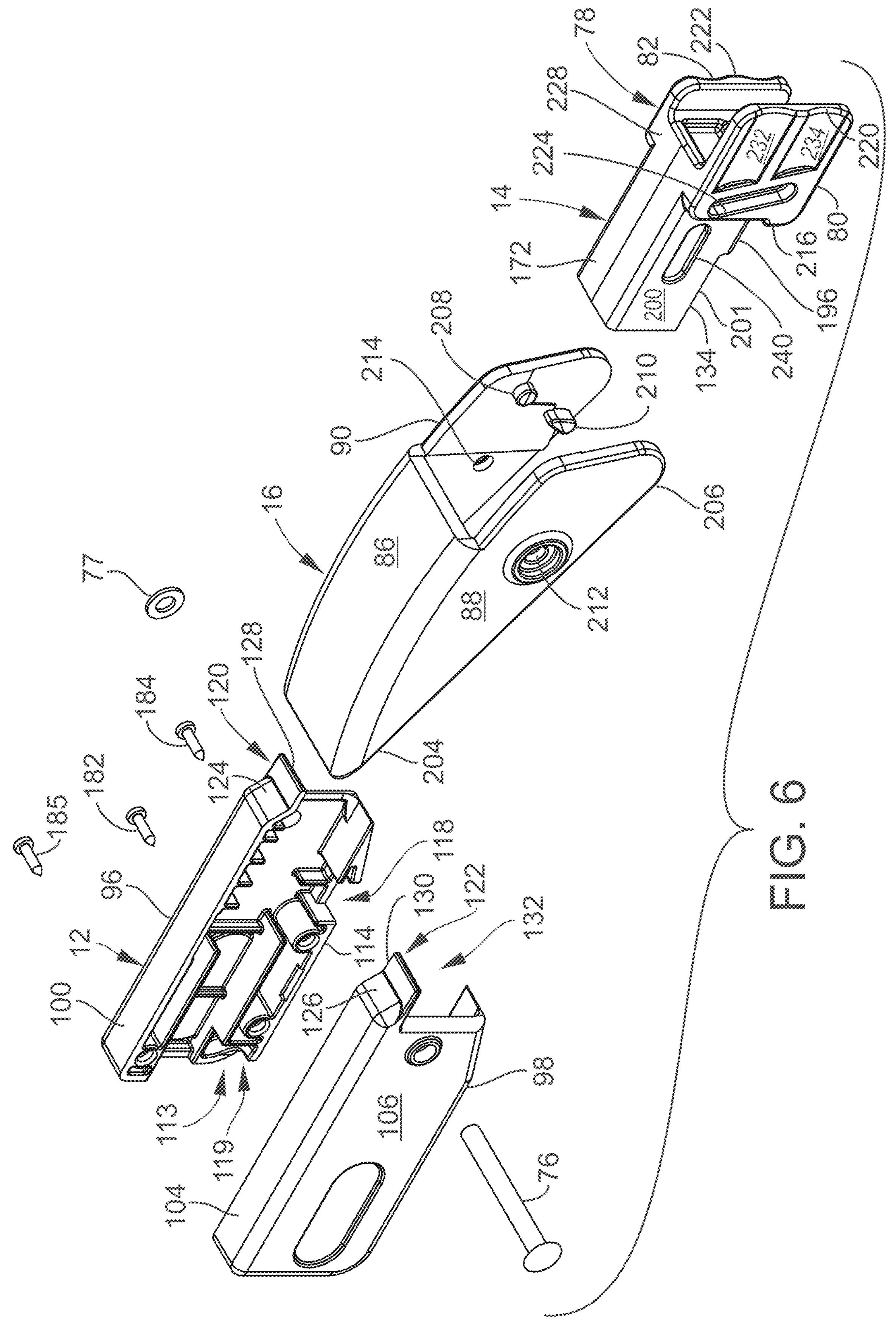
FIG. 6 is an exploded view of the housing, lift lever, and latch of the oblique slide latch apparatus of FIG. 1B.
Figure 7:
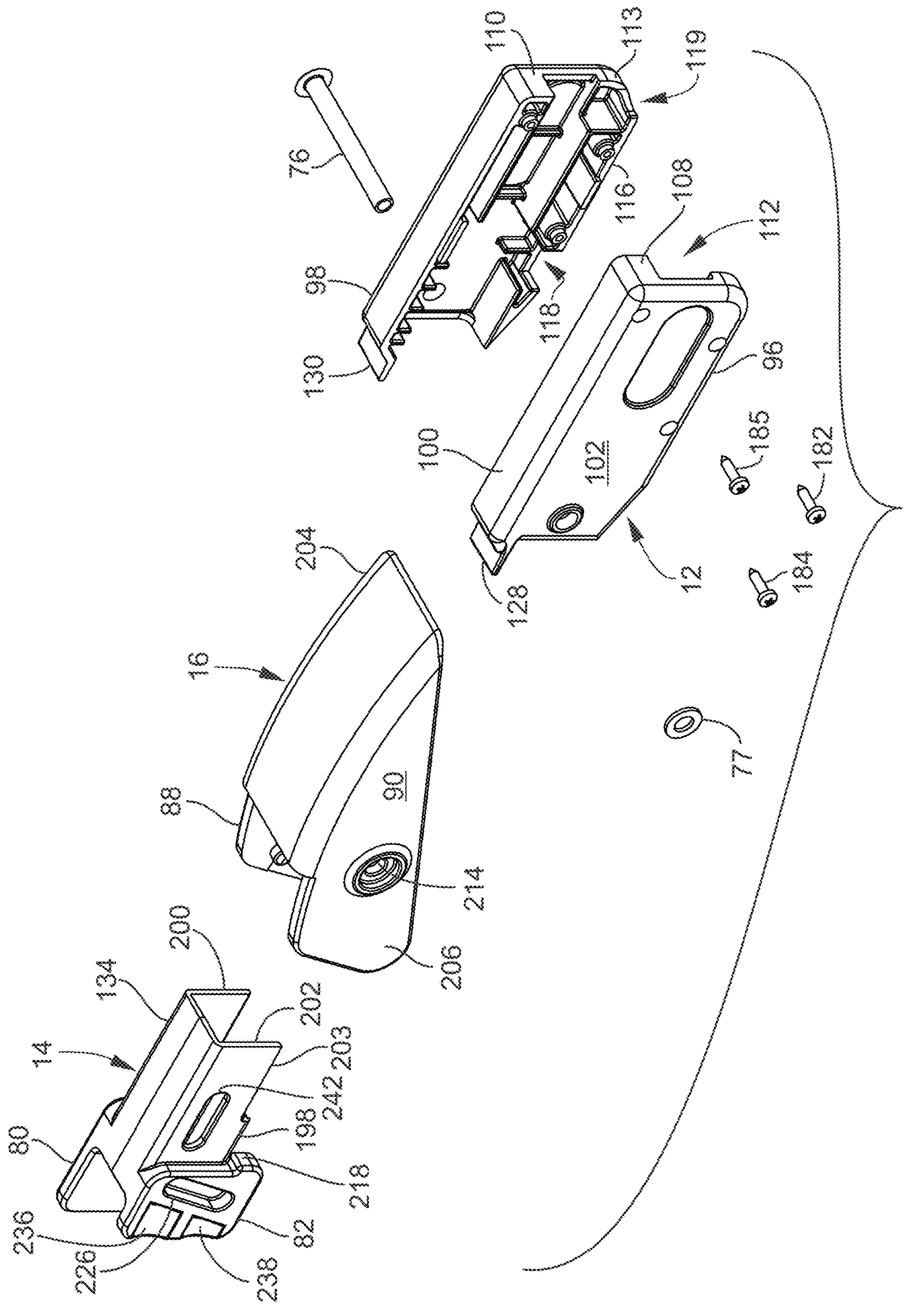
FIG. 7 is an exploded view of the housing, lift lever, and latch of the oblique slide latch apparatus of FIG. 1B from the other side of that shown in FIG. 7.
Figure 8A:
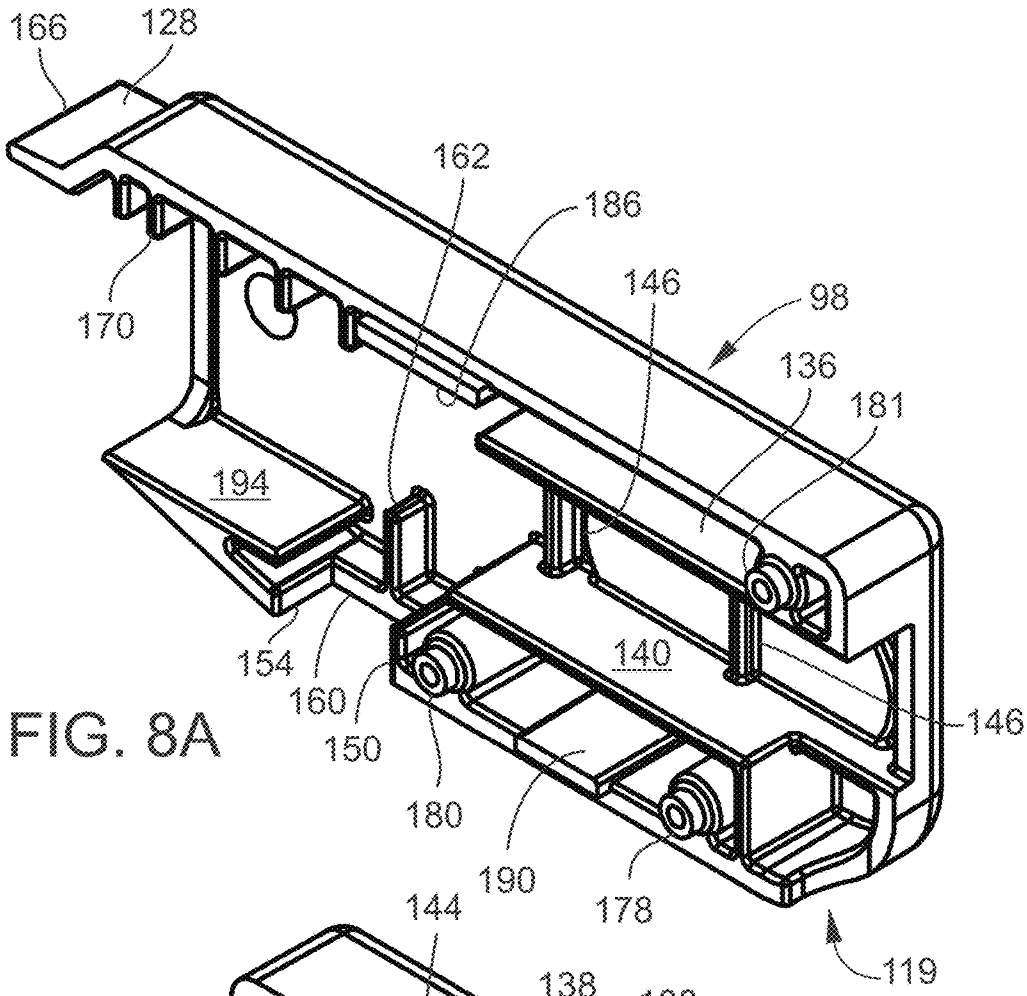
FIG. 8A is a detail perspective view of the right side of the housing of the oblique slide latch apparatus of FIG. 1B.
Figure 8B:
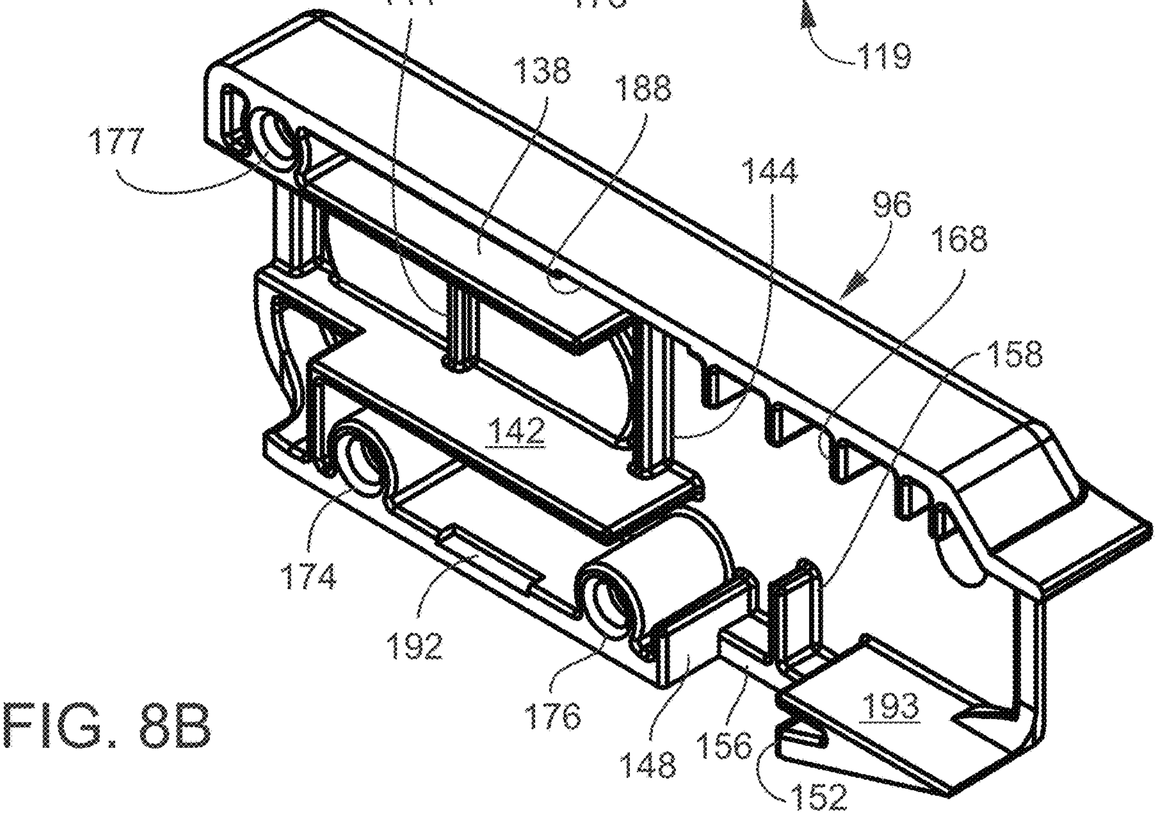
FIG. 8B is a detail perspective view of the left side of the housing of the oblique slide latch apparatus of FIG. 1B.

FIGS. 6 and 7 are exploded views of the housing 12, lever 16 and latch 14. FIGS. 8A and 8B show detail views of housing 12. Housing 12 includes a left half housing portion 96 and a right half housing portion 98. Left half housing portion 96 includes a top portion 100 and a left side 102. Right half housing portion 98 includes a top portion 104 and a right side 106. Housing portions 96, 98 include respective rear sides 108, 110 that when engaged form a first opening 112 for top vertical support member 54 of gate 22. Rear sides 108, 110 form a second opening 113 for the reception of vertical support member 58 of gate 22. At the rear sides 108, 110, the top portions 100, 104 are disposed at an altitude lower than the lower face of ledge 74 and are spaced from the ledge 74 to permit an end of the lever 16 to be engaged on the top portions 100, 104 and under the ledge 74 when the lever 16 is closed. Housing portions 96, 98 include respective bottom portions 112, 114. Bottom portions 112, 114 when engaged form a first opening 118 for the reception of end vertical support member 50 of gate 22. Bottom portions 112, 114 when engaged form a second opening 119 for reception of vertical support member 58 of gate 22. Housing half portions 96, 98 include respective distal sides 120, 122 that include respective oblique portions 124, 126 that lead into respective extensions 128, 130. Distal sides 120, 122 when engaged form an opening 132 for receiving a neck 134 of the latch 14.

Left and right housing portions 96, 98 include respective upper horizontal plates 136, 138 and respective lower horizontal plates 140, 142. The plates 136, 138, 140, 142 extend from the sides 102, 108 and confront the upper and lower sides of the gate upper support member 54. Housing portions 96, 98 include respective ribs 144, 146 running between the left plates 136, 140 and the right plates 138, 142. Ribs 144, 146 confront the left and right sides of the gate upper support member 54. Plates 136, 138, 140, 142 and ribs 144, 146 are inner housing support members for the gate upper support member 54 to minimize wobble of the housing 12 relative to the gate upper support member 54.

Left and right housing portions 96, 98 include respective vertical plates 148, 150 for confronting the inner face of end vertical support member 50 of gate 22. Left and right housing portions 96, 98 include respective edges 152, 154 for confronting the outer face of end vertical support member 50 of gate 22. Left housing portion 96 includes a horizontal edge 156 and vertical rib 158 for confronting a left side of end vertical support member 50 and right housing portion 98 includes a horizontal edge 160 and vertical rib 162 for confronting a right side of end vertical support member 50. Edges 152, 154, 156, 160 form opening 118.

Gate upper support member 54 and gate end vertical support member 50 are engaged to each other, as shown in FIGS. 9A, 9B, 9C, and 9D. Gate upper support member 54 extends forwardly of gate end vertical support member 50 and terminates at distal end 164, shown in FIGS. 9A, 9B, 9C, and 9D. Distal end 164 is disposed inwardly of the front edge 166 of extension 128.

The inside of the housing 12 includes a set of depending ribs 168, 170. Ribs 168 extend from the top 100 of housing half portion 96. Ribs 170 extend from the top 104 of housing half portion 98. Ribs 168, 170 terminate short of a plane defined by the bottom face of plate portions 136, 138. Ribs 168, 170 terminate about in a plane defined by the upper face of plate portions 146, 138. Ribs 168, 170 confront the top 172 of the latch neck 134 as the latch neck 134 slides on gate upper horizontal support member 54.

The inside of the housing 12 further includes cylindrical pin receptors 174, 176, 177, 178, 180, 181. Receptors 174, 176, 177 are disposed in housing portion 96. Receptors 178, 180, 181 are disposed in housing portion 98. Receptors 178, 180, 181 have male ends that engage female ends 174, 176, 177, respectively. Pin connectors 182, 184, 185 engage the receptors 174, 176, 177, 178, 180, 181 and draw the housing portions 96, 98 together. As the housing portions 96, 98 are drawn together, locator tabs 186, 190 of housing half portion 98 engage respective locator slots 188, 192 of housing half portion 96.

The inside of housing 12 further includes plate portions 193, 194. Plate portion 193 is in housing portion 96. Plate portion 194 is in housing portion 98. Plate portions 193, 194 lead in from opening 132 and support distal edge portions 196, 198 of respective sides 200, 202 of latch neck 134. Sides 200, 202 further include bottom proximal edge portions 201, 203 that extend at a higher altitude than do edge portions 196, 198.

Lever 16 includes top 86, and sides 88, 90. Lever 16 includes a proximal end portion 204 that is lifted by the hand or fingers and a distal end portion 206. On the inside of each of the sides 88, 90, at the distal end portion 206, lever 16 includes a first peg 208 and a second peg 210. First peg 208 is cylindrical. Second peg 210 is a triangular or tear drop shape. Second peg 210 includes a base having two sides that taper from the base toward each other to terminate at a tip or apex. Second peg 210 extends to a slightly greater depth than does first peg 208. Each of the sides 88, 90 of lever 16 includes respective openings 212, 214 for pivot pin 76.

Latch 14 includes latch head 78 having extensions 80, 82. Latch head 78 further includes base 92. Extensions 80, 82 and base 92 form a U-shape that engages a portion of standard 26 and a portion of corner portion 42. As a whole, latch head 78 is H-shaped. Standard 26 and corner portion 42 are portions of the frame 20 of the gated barrier 18. Latch 14 further includes a latch neck 134 having a pair of sides 200, 202. Side 202 includes an edge portion 198. Side 200 includes edge portion 196. Latch neck 134 further includes a top 172. Latch neck top 172 and latch sides 200, 202 form a U-shape that engages and slides on gate upper horizontal support member 54. Latch head extension 80 projects further distally than latch head extension 82. The width between outer faces of latch head extensions 80 and 82 is greater than the width between outer faces of the latch neck sides 200, 202. Latch head 78 includes a pair of stepped base edges 216, 218. Each of the stepped edges 216, 218 includes an upper and lower straight edge portion that are offset from each other. Stepped edge 216 is opposite of distal vertical edge 220 of latch head extension 80. Stepped edge 218 is opposite of distal vertical edge 222 of latch head extension 82. The outer face of latch head extension 80 includes an oblique channel 224. The outer face of latch head extension 82 includes an oblique channel 226. Each of the oblique channels 224, 226 is straight. The top of each of the oblique channels 224, 226 is proximal relative to the latch neck 134 and adjacent to its respective stepped edge 216, 218. The bottom of each of the oblique channels 224, 226 is distal relative to the latch neck 134 and spaced from its respective stepped edge 216, 218. The top of each of the oblique channels 224, 226 is adjacent to a top 228 of the latch head 78. The bottom of each of the oblique channels 224, 226 is adjacent to a bottom 230 of the latch head 78. Bottom 230 is shown in FIGS. 9A, 9B, 9C, and 9D. Channel 224 engages first peg 208 of lever side 88. Channel 226 engages first peg 208 of lever side 90. Stepped edge 216 engages second peg 210 of lever side 88. Stepped edge 218 engages second peg 210 of lever side 90. The first peg 208 is disposed distally of the second peg 210 when the lever 16 is in each of the closed and open positions. The first peg 210 is disposed at a greater altitude than the second peg 210 when the lever 16 is in each of the closed and open positions. As the lever 16 moves between the closed and open positions, different surface portions of the pegs 208, 210 continually engage different surface portions of the oblique channels 224, 226 and the stepped edges 216, 218.

Latch head extension 80 includes a pair of horizontal upper and lower channels 232, 234 that open distally on the vertical edge 220 and that are closed with an oblique edge proximally. Latch head extension 82 includes a pair of horizontal upper and lower channels 236, 238 that open distally on the vertical edge 222 and that are closed with an oblique edge proximally. Such proximal edges disposed at the closed end of the channels 232, 234, 236, 238 run parallel to the axis of the oblique channels 224, 226.

Latch neck 134 includes a pair of horizontal slots 240, 242. Slot 240 is formed in latch side 200. Slot 242 is formed in latch side 202. Slots 240, 242 are aligned and extend horizontally. Gate upper horizontal support member 54 includes a pivot opening 244, shown in FIGS. 9A, 9B, 9C, and 9D, in each of the sides of the tubular gate upper horizontal support member 54. Pivot opening 244 receives pivot pin 76. Pivot openings 244 are aligned with slots 240, 242.

Latch head 78 is H-shaped such that a base 92 ties the longer latch head extension 80 to the shorter latch head extension 82. The distal face of base 92 includes upper, lower, and intermediate horizontal ribs projecting distally from base 92, as shown in FIG. 14C. The proximal face of base 92 is a stop that stops against the distal end of gate upper horizontal support member 54 when the latch 14 is drawn in by the lever 16.

The height of the latch neck 134 is greater than the height of the latch head 78 whether the height of the latch neck 134 is measured 1) between latch neck top 172 and any of the distal latch edge portions 196, 198 or 2) between latch neck top 172 and any of the proximal latch edge portions 201, 203.

Slide lock 68 is spring biased. Slide lock 68 includes a slide pin 246 engaged with the slide lock main body 72 and further slidingly engaged in aligned slots 248 formed in each of the sides of the gate upper horizontal support member 54. Slide lock 68 includes the coil spring 70 having a proximal end engaged to slide pin 246 and a distal end engaged to pivot pin 76. Slide lock 68 is thus continually biased in the distal direction so as to keep the ledge 74 biased toward the locked position. Ledge 74 includes an upper tapered edge and the proximal end of lever 16 includes a lower edge oppositely tapered such that lever 16 can snap by the tapered edge of ledge 74 and into its closed position even when slide lock 68 is in its closed position.

Figure 9A:
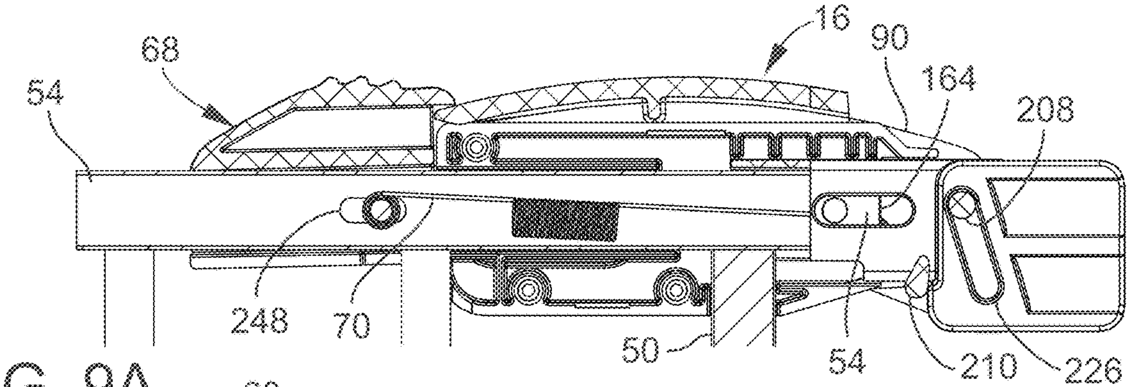
FIG. 9A is a section and partially phantom view of the oblique latch apparatus of FIG. 1B, showing the oblique slide latch apparatus in a closed position.
Figure 9B:
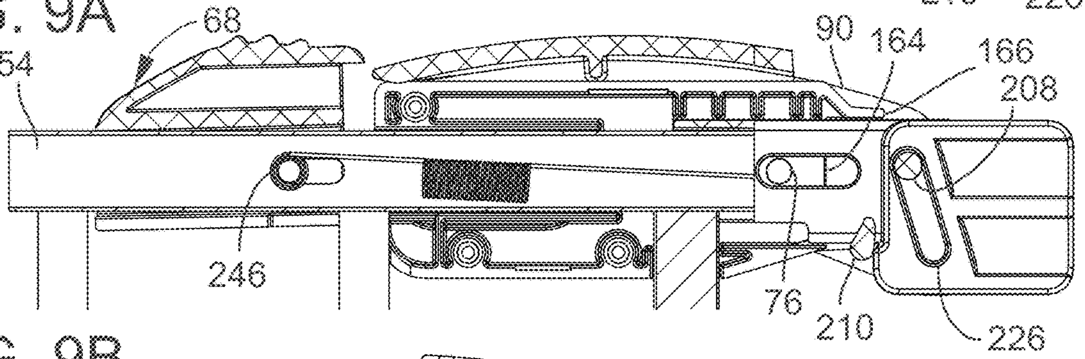
FIG. 9B is a section and partially phantom view of the oblique slide latch apparatus of FIG. 1B, showing the slide lock having been slid to an open position to permit the lift lever to swing.
Figure 9C:
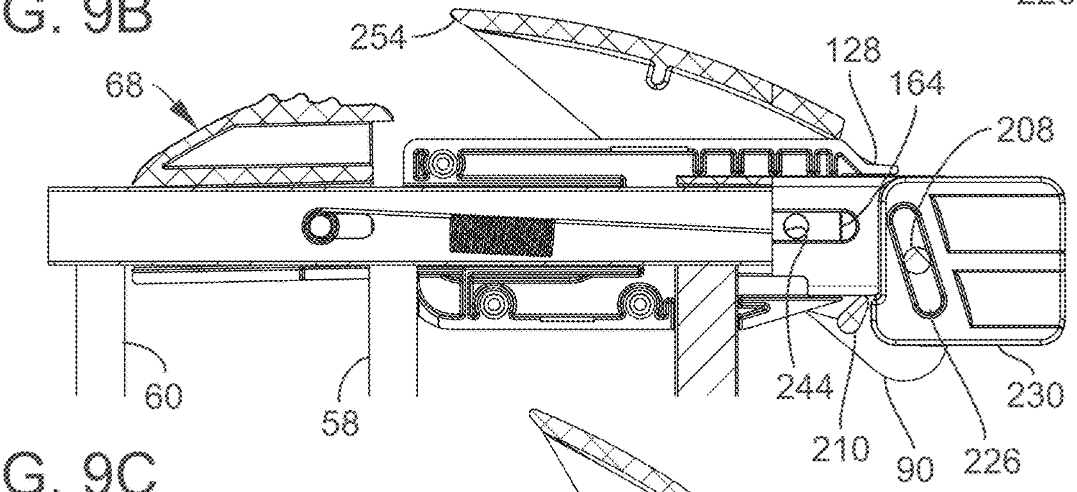
FIG. 9C is a section and partially phantom view of the oblique latch apparatus of FIG. 1B, showing the lift lever in an intermediate position between an open and closed position and further showing the slide lock having been released so as to return to a closed position.
Figure 9D:
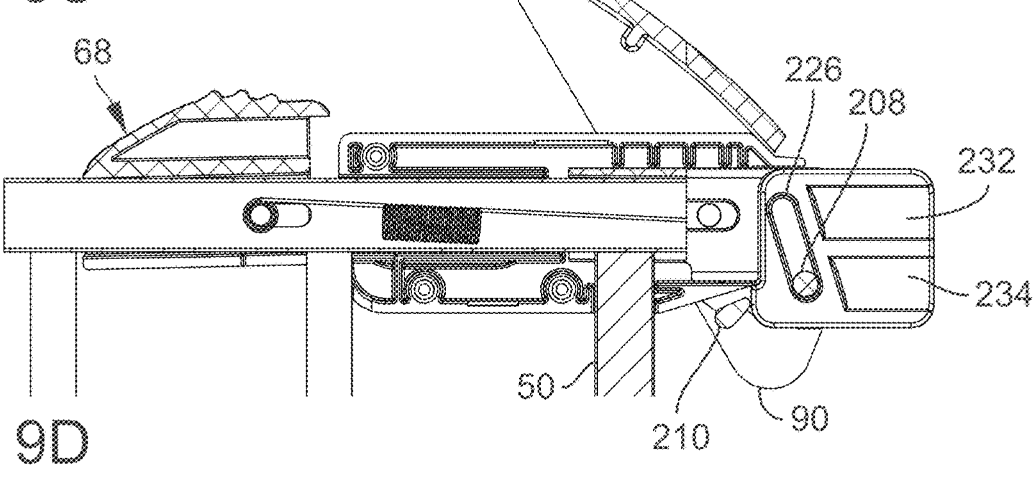
FIG. 9D is a section and partially phantom view of the oblique latch apparatus of FIG. 1B, showing the lift lever in a fully lifted position, showing the slide lock in a closed position, and showing the latch in an open position.

In operation, as shown in FIG. 9A, lever 16 is in a closed position and slide lock 68 is in a closed position. Latch head 78 is in the closed position where the latch head 78 engages the frame 20, namely, the standard 26 and the frame corner portion 42. Lever 16 is locked under the ledge 74 of the slide lock 68. First pegs 208 are in the upper ends of oblique channels 224, 226. Second pegs 210 are engaging the stepped base edges 216, 218 near the steps of the stepped base edges 216, 218. Latch neck 134, integral with latch head 78, is in the distal position, with the pivot pin 76 in the proximal end of slots 240, 242. FIG. 9B shows the slide lock 68 having been slid proximally, which is the first independent mechanical step that must be performed prior to swinging open the gate 22. When the slide lock 68 is slid in the proximal direction, the coil spring 70 is drawn to a greater pressure. FIG. 9C shows that the lever 16 has been pivoted from the closed position to an intermediate position. Slide lock 68 has been released and has been automatically returned to its closed position by the coil spring 70 pulling on the slide pin 246. As the lever 16 is pivoted, the first pegs 208 and the second pegs 210 travel in an arc about the pivot pin 76 and the first pegs 208, by engaging the oblique channels 224, 226, draw the latch 14 proximally and away from the standard 26 and frame corner portion 42. Latch neck 134 is guided as it is drawn proximally along a straight axis by the gate upper horizontal support member 54 on which the latch neck 134 rides, by the internal supports of the housing 12, by the slots 240, 242 riding on the pivot pin 76, by the portions of the housing 12 that form opening 132. Latch head 78, and thus its integral latch neck 134, is stabilized against wobble by the second pegs 210 continually engaging the stepped edges 216, 218 from the closed position of the lever 16 to the intermediate position of the lever 16 shown in FIG. 9C and to the fully open position of the lever 16 shown in FIG. 9D, which is completion of the second independent mechanical step that must be performed prior to swinging open the gate 22. In FIG. 9D, the slide lock 68 remains closed, the lever 16 has been fully opened, the first pegs 208 are in the bottom ends of the oblique channels 224, 226, the pivot pin 76 is adjacent to the distal end of slots 240, 242, the base 92 is at the distal end of the gate upper horizontal support member 54, the shorter extension 82 has cleared the inner faces of the standard 26 and the frame corner portion 42, and the longer extension 80 remains extended over the front faces of the standard 26 and frame corner portion 42 such that the gate 22 is swingable toward the front of the gated barrier 18 and is not swingable in the other direction.

In operation, to close the gate 22, the lever 16 is maintained in its open position. Lever 16 is maintained in its position by a friction fit between latch neck 134 and the gate upper horizontal support member 54, by a friction fit between latch neck 134 and the internal supports of the housing 12, and by a friction fit between the sides 88, 90 of the lever 16 and the sides 102, 106 of the housing 12. If an attempt to close the gate 22 is made when the lever 16 is in its closed and locked position engaged under the slide lock ledge 74, the outer face of the latch head extension 82 will hit the front faces of the standard 26 and frame corner portion 42. After gate 22 is closed with the latch head 78 in the proximal position such that shorter latch head extension 82 has bypassed the standard 26 and frame corner portion 42 and such that the inner face of latch head extension 80 extends over the front faces of the standard 26 and frame corner portion 42, the lever 16 is closed. As lever 16 is closed, the first pegs 208 travel in an arc about pivot pin 76 as first pegs 208 engage oblique channels 224, 226, thereby drawing the latch 14 distally and sliding the shorter latch head extension 82 over the rear faces of the standard 26 and frame corner portion 42 so as to lock the gate 22 to the frame 20. As the latch 14 is drawn distally, the second pegs 210 travel in an arc about pivot pin 76 and stabilize the latch head 78 and latch 14 as a whole.

Figure 10A:
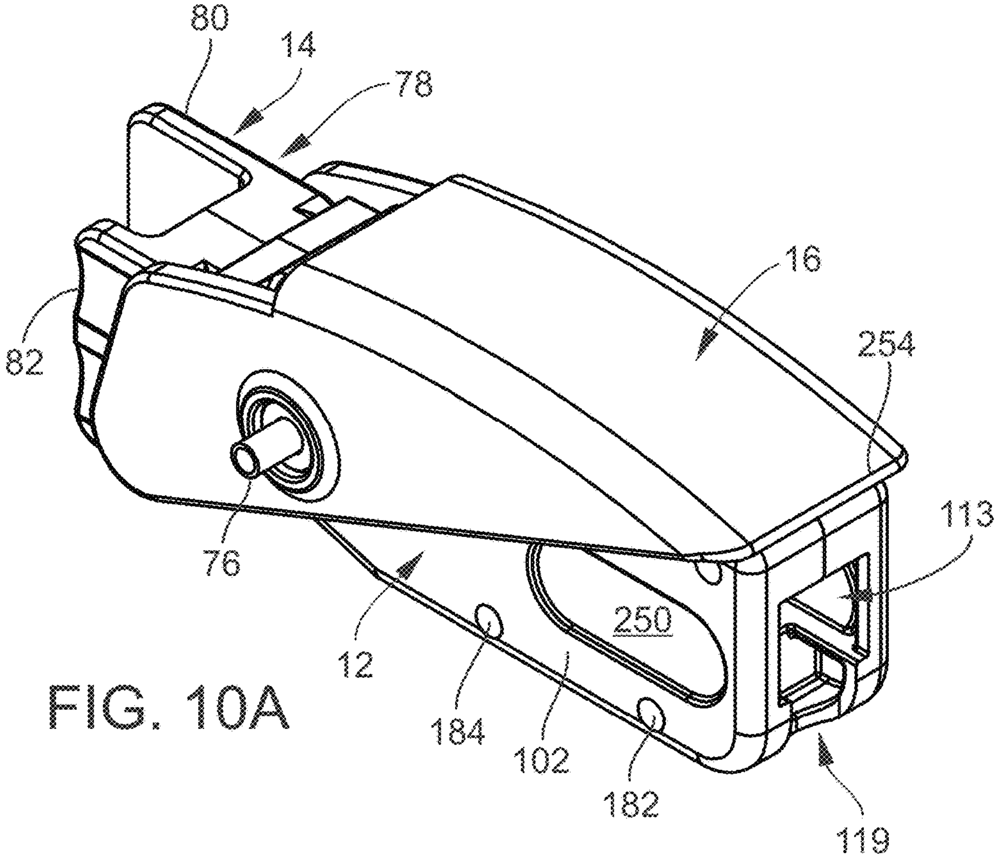
FIG. 10A is a detail top perspective view of the lift lever, housing, and latch of the oblique slide latch apparatus of FIG. 1A.
Figure 10B:
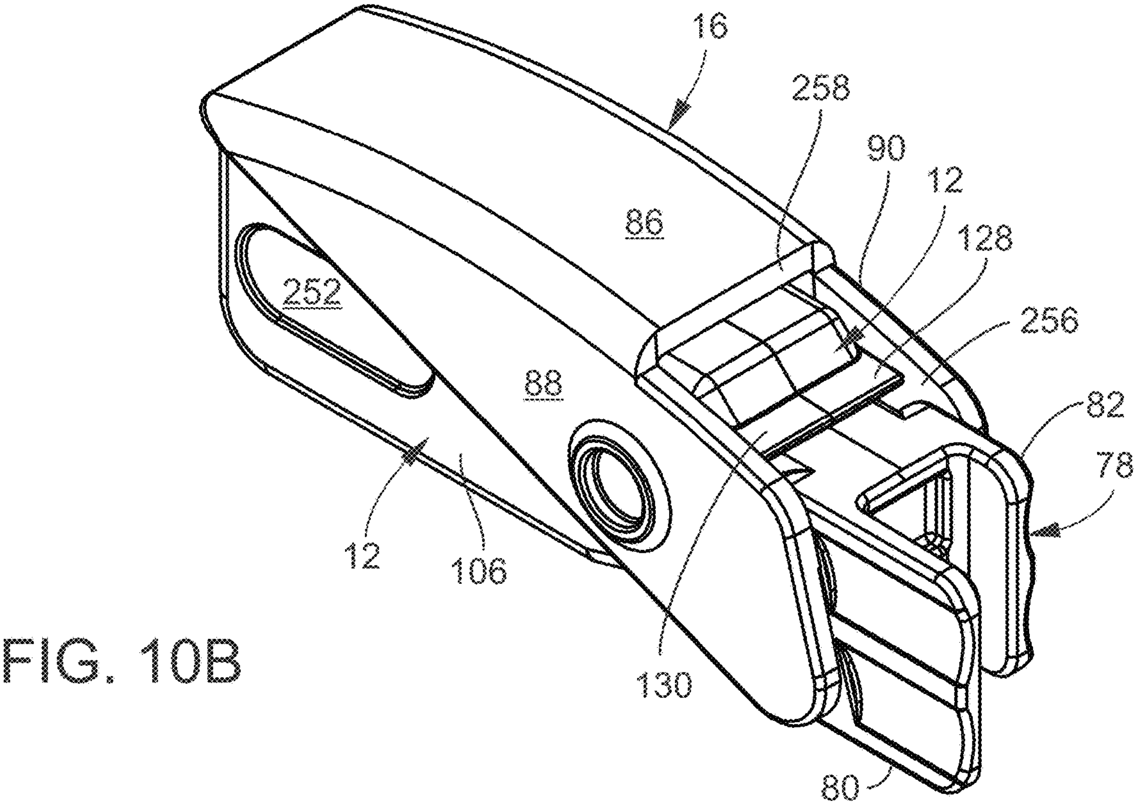
FIG. 10B is a detail top perspective view of the lift lever, housing, and latch of the oblique slide latch apparatus from the other side of the view of FIG. 10A.

As shown in FIGS. 10A and 10B, the oblong depressions 250, 252 in the housing sides 102, 106 receive name plates for the name of the company marketing the latch apparatus 10 or for the name of the particular latch apparatus. FIG. 10A shows the bevel or taper of the proximal beveled edge 254 of the proximal end 204 of the lever 16. Beveled edge 254 is also shown in FIGS. 9A, 9B, 9C, and 9D. FIG. 10B shows that housing extensions 128, 130 cover up, when the latch 14 is withdrawn by the lever 16, a pair of spaces 256 that are formed when the latch head 78 transitions to the latch neck 134 so as to minimize pinching of fingers or the skin of fingers. FIG. 10B shows that the distance between the inner faces of the sides 88, 90 of the lever 16 is greater than the distance between the outer faces of the latch head extensions 80, 82. FIG. 10B shows a front edge 258 of the top 86 of the lever 16. Front edge 258 is straight and runs to and between lever sides 88, 90. Front edge 258 is a stop that stops the lever 16 from further pivoting when front stop edge 258 when the front stop edge 258 abuts the extensions 128, 130 as shown in FIG. 9D. A further stop to the pivoting is an abutment of the first pegs 208 with the bottom ends of the oblique channels 224, 226. A further stop is provided by base 92 hitting the distal end of the gate upper horizontal support member 54.

Figure 11A:
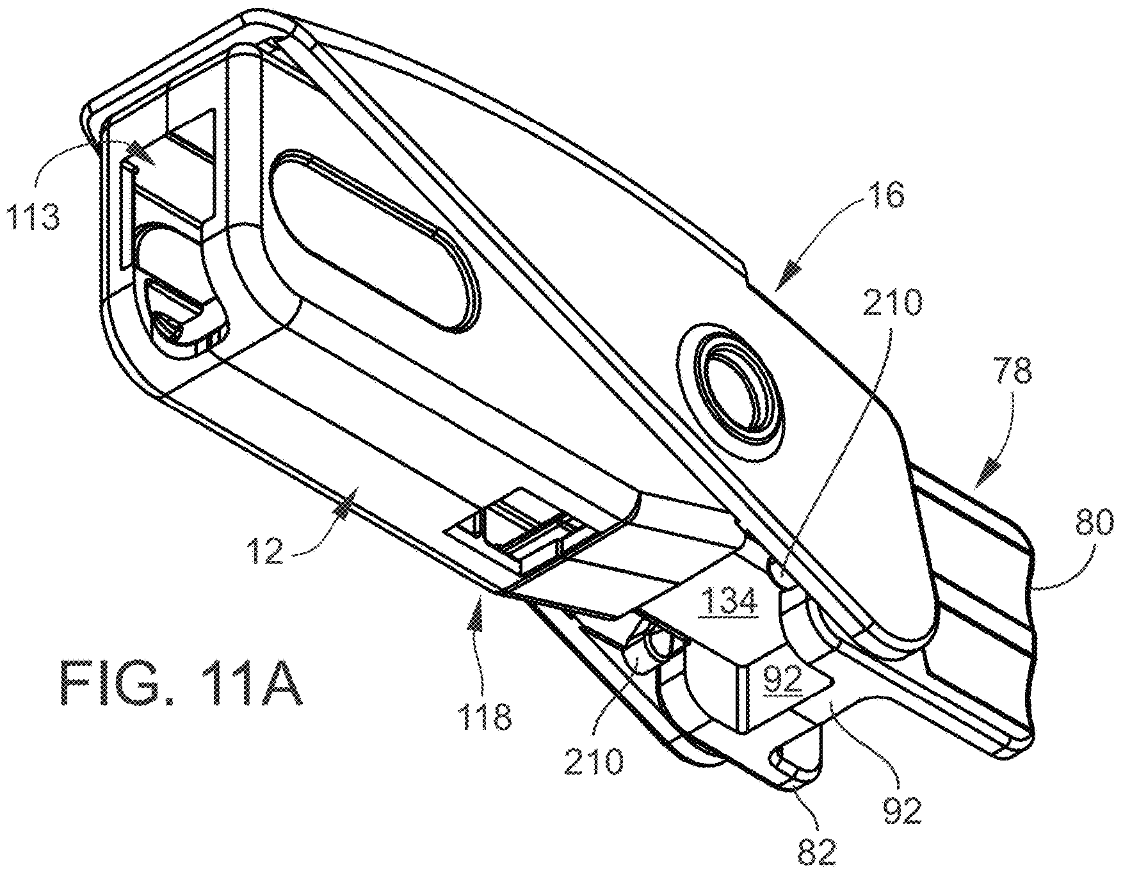
FIG. 11A is a detail bottom perspective view of the lift lever, housing, and latch of the oblique slide latch apparatus of FIG. 1A.
Figure 11B:
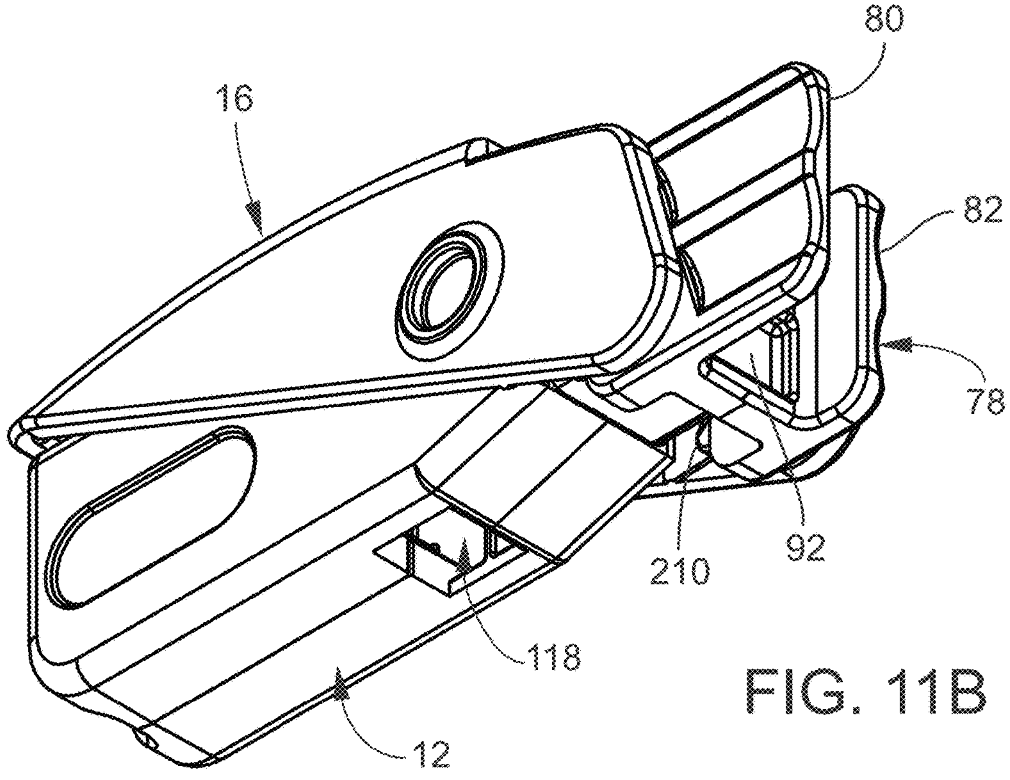
FIG. 11B is a detail bottom perspective view of the lift lever, housing, and latch of the oblique slide latch apparatus from the other side of the view of FIG. 10A.

FIGS. 11A and 11B show that, while the distal portion of the latch head 78 is U-shaped, the latch head 78 as a whole is H-shaped. FIGS. 11A and 11B show that extensions 80, 82 extend both proximally and distally of the latch head base 92. Latch neck 134 extends into the latch head 78 between the proximal portions of extensions 80, 82. Latch neck 134 is integrally connected with inner faces of proximal portions of the extensions 80, 82.

Figure 12A:
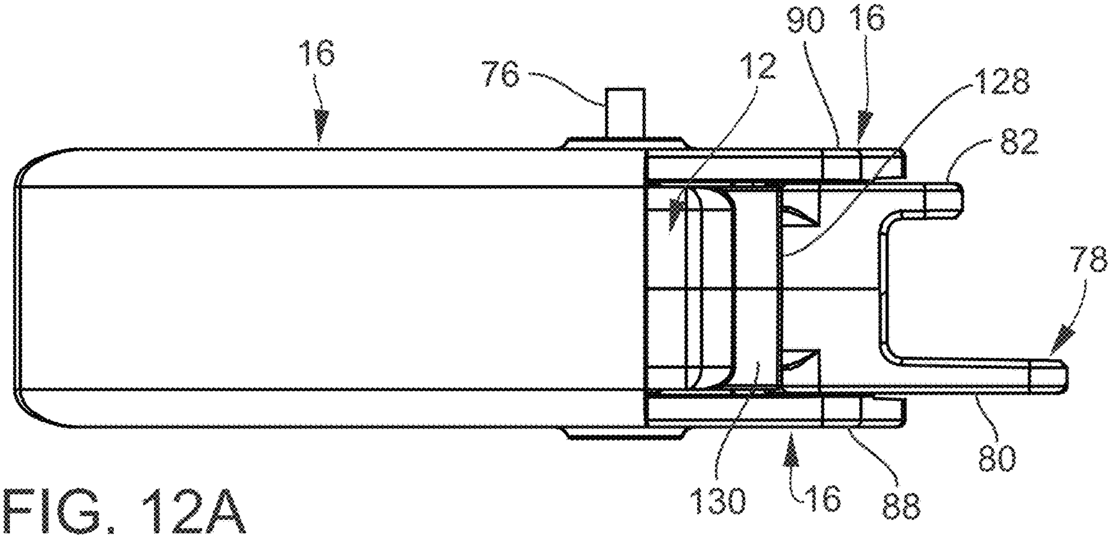
FIG. 12A is a detail top view of the lift lever, housing, and latch of the oblique slide latch apparatus of FIG. 1B.
Figure 12B:
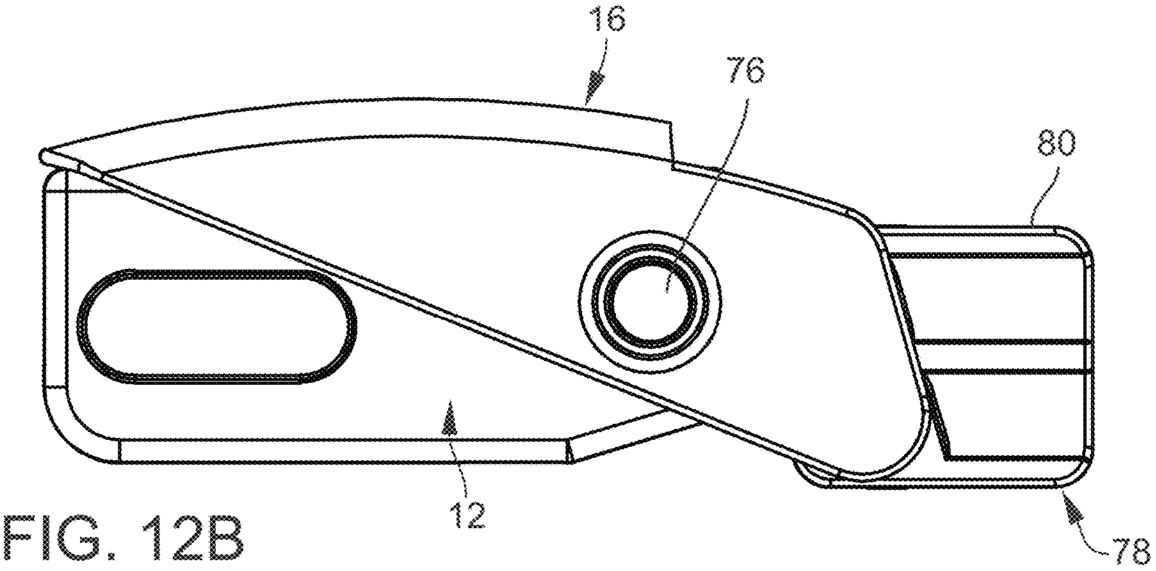
FIG. 12B is a detail side view of the lift lever, housing, and latch of the oblique slide latch apparatus of FIG. 1B.
Figure 12C:
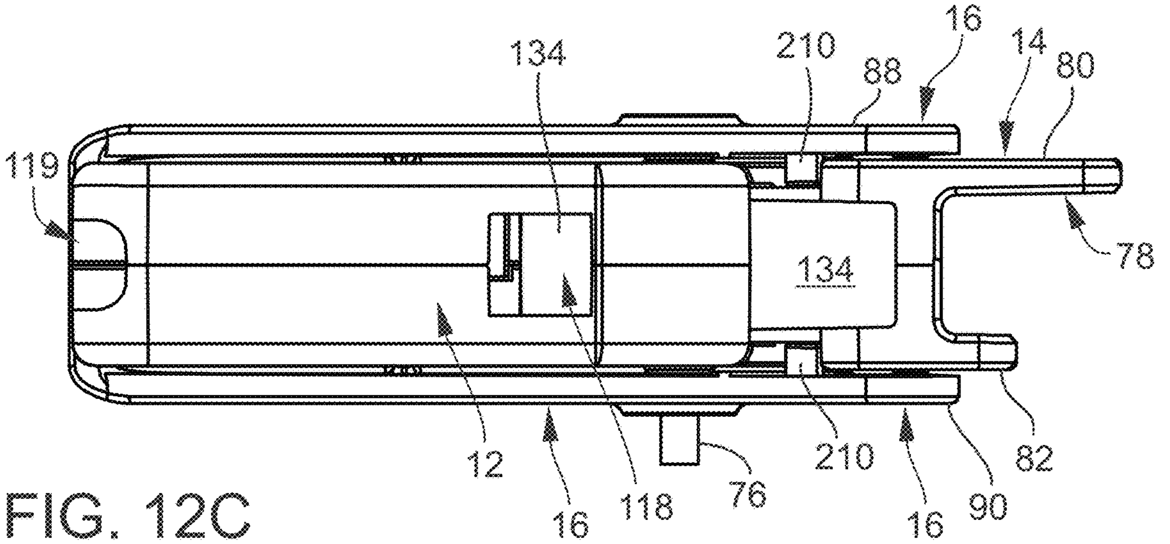
FIG. 12C is a detail bottom view of the lift lever, housing, and latch of the oblique slide latch apparatus of FIG. 1B.

FIGS. 12A and 12C show that the distance between the inner faces of the sides 88, 90 of the lever 16 is greater than the distance between the outer faces of the latch head extensions 80, 82. FIG. 12C shows the H-shaped of the latch head 78.

Figure 13:
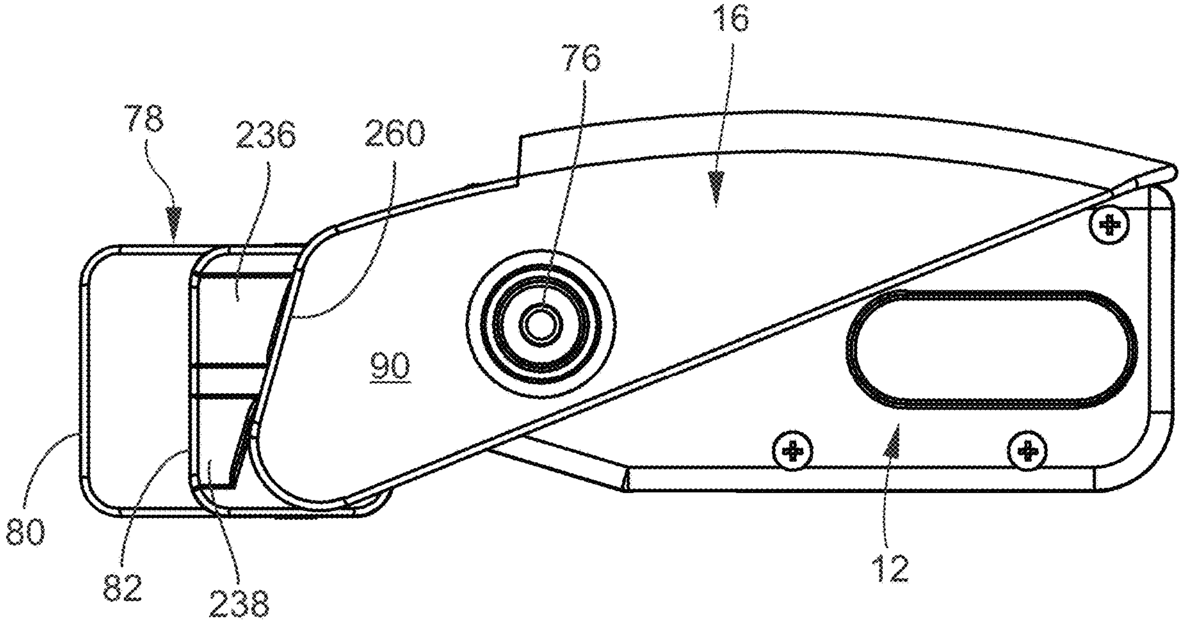
FIG. 13 is a detail side view of the lift lever, housing, and latch of the oblique slide latch apparatus from the other side of the view of FIG. 12B.

FIG. 13 shows that the longer latch head extension 80 has a greater length than does the shorter latch head extension 82. FIG. 13 further shows that a distal oblique edge 260 of lever side 90 of the lever 16 is adjacent to and parallel with the oblique closed edges of channels 236, 238 of latch head extension 82 when the lever 16 is in the closed position.

Figure 14A:
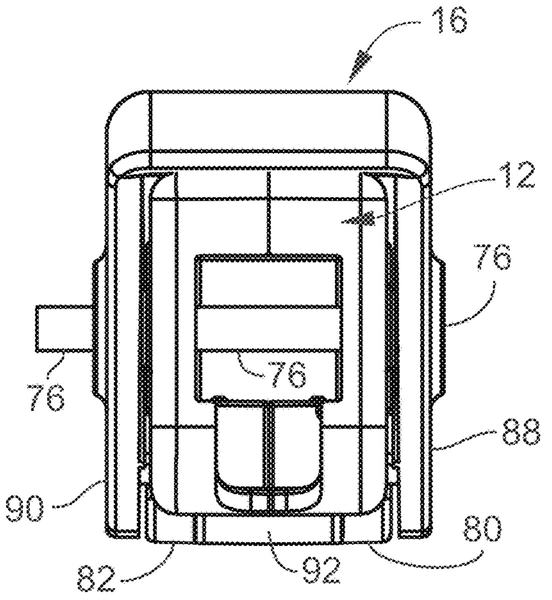
FIG. 14A is a detail rear view of the lift lever, housing, and latch of the oblique slide latch apparatus of FIG. 1B.
Figure 14B:
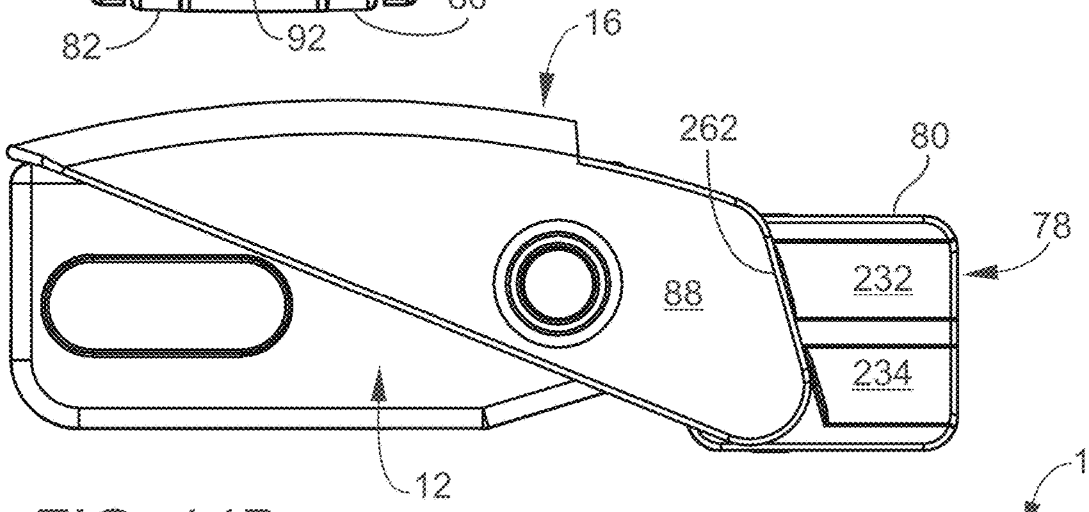
FIG. 14B is a detail side view of the lift lever, housing, and latch of the oblique slide latch apparatus of FIG. 1B.
Figure 14C:
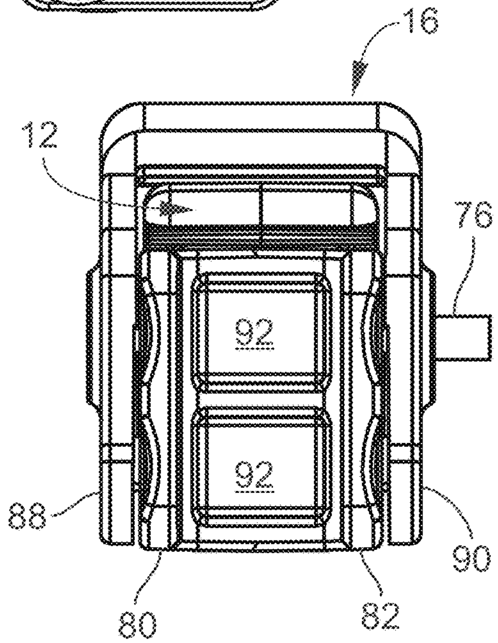
FIG. 14C is a detail front view of the lift lever, housing, and latch of the oblique slide latch apparatus of FIG. 1B.

FIG. 14A shows that the pivot pin 76 extends through the lever 16 and housing 12. FIG. 14B shows that a distal oblique edge 262 of lever side 88 of the lever 16 is adjacent to and parallel with the oblique closed edges of channels 232, 234 of latch head extension 80 when the lever 16 is in the closed position. FIG. 14C shows the distal face of base 92 that includes the upper, lower, and intermediate horizontal ribs projecting distally from base 92.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. A latch apparatus for engaging an object, comprising:

a) a housing having a proximal end and a distal end;

b) a latch slidably engaged to the housing, the latch extending out the distal end of the housing, the latch slidable along a straight axis, the latch having a latch distal end portion that engages the object, the latch having a channel with an upper end portion and a lower end portion;

c) a lever having a proximal end portion and a distal end portion, the lever being pivotably engaged to the housing, the distal end portion of the lever having a first peg, the first peg extending laterally such that, when the lever is pivoted, a travel of the first peg defines a first arc, the first peg of the lever engaging the channel of the latch such that:

i) when the lever is pivoted one way, the first peg travels along the first arc from the upper end portion of the channel to the lower end portion of the channel and thereby slidingly draws the latch toward the proximal end of the housing;

ii) when the lever is pivoted opposite of said one way, the first peg travels along the first arc from the lower end portion of the channel to the upper end portion of the channel and thereby slidingly draws the latch away from the proximal end of the housing;

d) wherein the channel is a straight channel;

e) wherein the straight channel includes a straight channel axis that is oblique relative to the straight axis along which the latch slides; and f) wherein the upper end portion of the straight channel includes a terminal upper end and wherein the lower end portion of the straight channel includes a terminal lower end, the terminal lower end of the straight channel being disposed distally of the terminal upper end of the straight channel such that the terminal lower end is disposed closer to latch distal end portion than is the terminal upper end and such that the terminal lower end is disposed closer to the object than is the terminal upper end.

* * * * *